United States Patent [19]

Guttag et al.

[11] 4,434,462

[45] Feb. 28, 1984

[54] OFF-CHIP ACCESS FOR PSUEDO-MICROPROGRAMMING IN MICROPROCESSOR

[75] Inventors: Karl M. Guttag; Jerry R. Vanaken, both of Houston, Tex.

[73] Assignee: Texas Instruments Incorporated, Dallas, Tex.

[21] Appl. No.: 210,107

[22] Filed: Nov. 24, 1980

[51] Int. Cl.³ .................. G06F 9/30; G06F 13/06
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 3,757,306 | 9/1973 | Boone | 364/200 |
| 4,086,626 | 4/1978 | Chung | 364/200 |
| 4,087,854 | 5/1978 | Kinoshita et al. | 364/200 |
| 4,093,982 | 6/1978 | Heuer et al. | 364/200 |

Primary Examiner—Thomas M. Heckler

Attorney, Agent, or Firm—John G. Graham

[57] ABSTRACT

A single-chip microprocessor device of the MOS/LSI type contains an ALU, internal busses, address/data registers, an instruction register, and control decode or microcontrol generator circuitry. The device communicates with external memory and peripherals by control lines and a bidirectional multiplexed address/data bus. In addition to the main off-chip memory, a smaller on-chip memory (including both ROM and RAM not in the main off-chip memory map) is provided which allows execution of instruction sequences to emulate complex instructions or interpretors (macro-instructions). The macro-instructions are indistinguishable from "native" instructions since all memory fetches and the like are generated exactly the same way, and long instruction sequences are interruptable. Also, off-chip access of another memory separate from the main memory allows emulator functions or special instructions.

11 Claims, 6 Drawing Figures

Fig. 2c (con't.-2)

| | INSTR. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| GROUP G6 | MPYS | 0 | 0 | 0 | 0 | 0 | 0 | 0 | 1 | 1 | 1 | X | X | X | X | X | X |
| | DIVS | 0 | 0 | 0 | 0 | 0 | 0 | 0 | 1 | 1 | 0 | ←FIELD→ | | | | | |
| | BIND | 0 | 0 | 0 | 0 | 0 | 0 | 0 | 1 | 0 | 1 | | | | | | |
| | EVAD | 0 | 0 | 0 | 0 | 0 | 0 | 0 | 1 | 0 | 0 | | | | | | |
| GROUP G7 | ILLEGAL | 0 | 0 | 0 | 0 | 0 | 0 | 0 | 0 | 1 | 1 | X | X | X | X | X | X |
| | BLSK | 0 | 0 | 0 | 0 | 0 | 0 | 0 | 0 | 1 | 0 | 1 | 1 | ←FIELD→ | | | |
| | ILLEGAL | 0 | 0 | 0 | 0 | 0 | 0 | 0 | 0 | 1 | 0 | 1 | 0 | X | X | X | X |
| | LWP | 0 | 0 | 0 | 0 | 0 | 0 | 0 | 0 | 1 | 0 | 0 | 1 | | | | |
| G8 | LST | 0 | 0 | 0 | 0 | 0 | 0 | 0 | 0 | 1 | 0 | 0 | 0 | ←FIELD→ | | | |
| | ILLEGAL | 0 | 0 | 0 | 0 | 0 | 0 | 0 | 0 | 0 | 1 | X | X | X | X | X | X |
| GROUP G9 | ILLEGAL | 0 | 0 | 0 | 0 | 0 | 0 | 0 | 0 | 0 | 0 | 1 | 1 | X | X | X | X |
| | ILLEGAL | 0 | 0 | 0 | 0 | 0 | 0 | 0 | 0 | 0 | 0 | 1 | 0 | 1 | 1 | X | X |
| | ILLEGAL | 0 | 0 | 0 | 0 | 0 | 0 | 0 | 0 | 0 | 0 | 1 | 0 | 1 | 0 | 1 | 1 |
| | AM | 0 | 0 | 0 | 0 | 0 | 0 | 0 | 0 | 0 | 0 | 1 | 0 | 1 | 0 | 1 | 0 |
| | SM | 0 | 0 | 0 | 0 | 0 | 0 | 0 | 0 | 0 | 0 | 1 | 0 | 1 | 0 | 0 | 1 |
| | ILLEGAL | 0 | 0 | 0 | 0 | 0 | 0 | 0 | 0 | 0 | 0 | 1 | 0 | 1 | 0 | 0 | 0 |
| | ILLEGAL | 0 | 0 | 0 | 0 | 0 | 0 | 0 | 0 | 0 | 0 | 1 | 0 | 0 | X | X | X |
| | ILLEGAL | 0 | 0 | 0 | 0 | 0 | 0 | 0 | 0 | 0 | 0 | 0 | 1 | 1 | 1 | 1 | 1 |
| GROUP G10 | ILLEGAL | 0 | 0 | 0 | 0 | 0 | 0 | 0 | 0 | 0 | 0 | 0 | 1 | 1 | 1 | 1 | 0 |
| | SLAM | 0 | 0 | 0 | 0 | 0 | 0 | 0 | 0 | 0 | 0 | 0 | 1 | 1 | 1 | 0 | 1 |
| | SRAM | 0 | 0 | 0 | 0 | 0 | 0 | 0 | 0 | 0 | 0 | 0 | 1 | 1 | 1 | 0 | 0 |
| | ILLEGAL | 0 | 0 | 0 | 0 | 0 | 0 | 0 | 0 | 0 | 0 | 0 | 1 | 1 | 0 | X | X |
| | ILLEGAL | 0 | 0 | 0 | 0 | 0 | 0 | 0 | 0 | 0 | 0 | 0 | 1 | 0 | X | X | X |
| | ILLEGAL | 0 | 0 | 0 | 0 | 0 | 0 | 0 | 0 | 0 | 0 | 0 | 0 | X | X | X | X |
| | | 0 | 1 | 2 | 3 | 4 | 5 | 6 | 7 | 8 | 9 | 10 | 11 | 12 | 13 | 14 | 15 |

FIELD

Fig. 2c

| INSTR. | OPCODE | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| SOCB | 1 | 1 | 1 | 1 | X | X | X | X | X | X | X | X | X | X | X | X |
| SOC | 1 | 1 | 1 | 0 | X | X | X | X | X | X | X | X | X | X | X | X |
| MOVB | 1 | 1 | 0 | 1 | | | | | | | | | | | | |
| MOV | 1 | 1 | 0 | 0 | | | | | | | | | | | | |
| AB | 1 | 0 | 1 | 1 | | | | | | | | | | | | |
| A | 1 | 0 | 1 | 0 | | | | | | | | | | | | |
| CB | 1 | 0 | 0 | 1 | | | | | | | | | | | | |
| C | 1 | 0 | 0 | 0 | | | | | | | | | | | | |
| SB | 0 | 1 | 1 | 1 | | | | | | | | | | | | |
| S | 0 | 1 | 1 | 0 | | | | | | | | | | | | |
| SZCB | 0 | 1 | 0 | 1 | | | | | | | | | | | | |
| SZC | 0 | 1 | 0 | 0 | | | | | | | | | | | | |
| DIV | 0 | 0 | 1 | 1 | 1 | 1 | | | | | | | | | | |
| MPY | 0 | 0 | 1 | 1 | 1 | 0 | | | | | | | | | | |
| STCR | 0 | 0 | 1 | 1 | 0 | 1 | | | | | | | | | | |
| LDCR | 0 | 0 | 1 | 1 | 0 | 0 | | | | | | | | | | |
| XOP | 0 | 0 | 1 | 0 | 1 | 1 | | | | | | | | | | |
| XOR | 0 | 0 | 1 | 0 | 1 | 0 | | | | | | | | | | |
| CZC | 0 | 0 | 1 | 0 | 0 | 1 | | | | | | | | | | |
| COC | 0 | 0 | 1 | 0 | 0 | 0 | | | | | | | | | | |
| TB | 0 | 0 | 0 | 1 | 1 | 1 | 1 | 1 | | | | | | | | |
| SBZ | 0 | 0 | 0 | 1 | 1 | 1 | 1 | 0 | | | | | | | | |
| SBO | 0 | 0 | 0 | 1 | 1 | 1 | 0 | 1 | | | | | | | | |
| JOP | 0 | 0 | 0 | 1 | 1 | 1 | 0 | 0 | | | | | | | | |
| JH | 0 | 0 | 0 | 1 | 1 | 0 | 1 | 1 | | | | | | | | |
| JL | 0 | 0 | 0 | 1 | 1 | 0 | 1 | 0 | | | | | | | | |
| JNO | 0 | 0 | 0 | 1 | 1 | 0 | 0 | 1 | | | | | | | | |
| JOO | 0 | 0 | 0 | 1 | 1 | 0 | 0 | 0 | | | | | | | | |
| JNC | 0 | 0 | 0 | 1 | 0 | 1 | 1 | 1 | | | | | | | | |
| JNE | 0 | 0 | 0 | 1 | 0 | 1 | 1 | 0 | | | | | | | | |
| JGT | 0 | 0 | 0 | 1 | 0 | 1 | 0 | 1 | | | | | | | | |
| JHB | 0 | 0 | 0 | 1 | 0 | 1 | 0 | 0 | | | | | | | | |
| JEQ | 0 | 0 | 0 | 1 | 0 | 0 | 1 | 1 | | | | | | | | |
| JLL | 0 | 0 | 0 | 1 | 0 | 0 | 1 | 0 | | | | | | | | |
| JLT | 0 | 0 | 0 | 1 | 0 | 0 | 0 | 1 | | | | | | | | |
| JMP | 0 | 0 | 0 | 1 | 0 | 0 | 0 | 0 | | | | | | | | |
| ILLEGAL | 0 | 0 | 0 | 0 | 1 | 1 | 1 | X | X | X | X | X | X | X | X | X |
| ILLEGAL | 0 | 0 | 0 | 0 | 1 | 1 | 0 | 1 | X | X | X | X | X | X | X | X |
| ILLEGAL | 0 | 0 | 0 | 0 | 1 | 1 | 0 | 0 | 1 | X | X | X | X | X | X | X |
| ILLEGAL | 0 | 0 | 0 | 0 | 1 | 1 | 0 | 0 | 0 | 1 | X | X | X | X | X | X |
| ILLEGAL | 0 | 0 | 0 | 0 | 1 | 1 | 0 | 0 | 0 | 0 | 1 | X | X | X | X | X |
| ILLEGAL | 0 | 0 | 0 | 0 | 1 | 1 | 0 | 0 | 0 | 0 | 0 | 1 | X | X | X | X |
| ILLEGAL | 0 | 0 | 0 | 0 | 1 | 1 | 0 | 0 | 0 | 0 | 0 | 0 | 1 | X | X | X |

GROUP G0: SOCB through SZC
GROUP G1: DIV through COC
GROUP G2: TB through JMP

Bits 0–3: OPCODE FIELD (Group G0); Bits 4–5: TD (TYPE OF DESTINATION ADDRESSING); Bits 6–9: D (DESTINATION ADDRESS BITS); Bits 10–11: TS (TYPE OF SOURCE ADDRESSING); Bits 12–15: S (SOURCE ADDRESS BITS)

Fig. 2c (con't. -1)

| | INSTR. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| GROUP G3 | TSMB | 0 | 0 | 0 | 0 | 1 | 1 | | | FIELD | | | | 1 | 0 | 1 | 1 |
| | TCMB | 0 | 0 | 0 | 0 | 1 | 1 | | | | | | | 1 | 0 | 1 | 0 |
| | TMB | 0 | 0 | 0 | 0 | 1 | 1 | | | | | | | 1 | 0 | 0 | 1 |
| | ILLEGAL | 0 | 0 | 0 | 0 | 1 | 1 | | | | | | | 1 | 0 | 0 | 0 |
| | ILLEGAL | 0 | 0 | 0 | 0 | 1 | 1 | | | | | | 0 | X | X | X | X |
| | SRC | 0 | 0 | 0 | 0 | 1 | 0 | 1 | 1 | X | X | X | X | X | X | X | X |
| | SLA 15 | 0 | 0 | 0 | 0 | 1 | 0 | 1 | 0 | X | X | X | X | X | X | X | X |
| | SL | 0 | 0 | 0 | 0 | 1 | 0 | 0 | 1 | X | X | X | X | X | X | X | X |
| | SRA | 0 | 0 | 0 | 0 | 1 | 0 | 0 | 0 | X | X | X | X | X | X | X | X |
| GROUP G4 | LDD | 0 | 0 | 0 | 0 | 0 | 1 | 1 | 1 | 1 | 1 | X | X | X | X | X | X |
| | LDS | 0 | 0 | 0 | 0 | 0 | 1 | 1 | 1 | 1 | 0 | X | X | X | X | X | X |
| | ABS | 0 | 0 | 0 | 0 | 0 | 1 | 1 | 1 | 0 | 1 | X | | | | | |
| | SETO | 0 | 0 | 0 | 0 | 0 | 1 | 1 | 1 | 0 | 0 | X | | | | | |
| | SWPB | 0 | 0 | 0 | 0 | 0 | 1 | 1 | 0 | 1 | 1 | X | | | | | |
| | BL | 0 | 0 | 0 | 0 | 0 | 1 | 1 | 0 | 1 | 0 | X | FIELD | | | | |
| | DECT | 0 | 0 | 0 | 0 | 0 | 1 | 1 | 0 | 0 | 1 | X | | | | | |
| | DEC | 0 | 0 | 0 | 0 | 0 | 1 | 1 | 0 | 0 | 0 | X | | | | | |
| | INCT | 0 | 0 | 0 | 0 | 0 | 1 | 0 | 1 | 1 | 1 | X | | | | | |
| | INC | 0 | 0 | 0 | 0 | 0 | 1 | 0 | 1 | 1 | 0 | X | | | | | |
| | INV | 0 | 0 | 0 | 0 | 0 | 1 | 0 | 1 | 0 | 1 | X | | | | | |
| | NEG | 0 | 0 | 0 | 0 | 0 | 1 | 0 | 1 | 0 | 0 | X | | | | | |
| | CLR | 0 | 0 | 0 | 0 | 0 | 1 | 0 | 0 | 1 | 1 | X | | | | | |
| | X | 0 | 0 | 0 | 0 | 0 | 1 | 0 | 0 | 1 | 0 | X | | | | | |
| | B | 0 | 0 | 0 | 0 | 0 | 1 | 0 | 0 | 0 | 1 | X | | | | | |
| | BLWP | 0 | 0 | 0 | 0 | 0 | 1 | 0 | 0 | 0 | 0 | X | | | | | |
| GROUP G5 | LREX | 0 | 0 | 0 | 0 | 0 | 0 | 1 | 1 | 1 | 1 | 1 | | | | | |
| | CKOF | 0 | 0 | 0 | 0 | 0 | 0 | 1 | 1 | 1 | 1 | 0 | FIELD | | | | |
| | CKON | 0 | 0 | 0 | 0 | 0 | 0 | 1 | 1 | 1 | 0 | 1 | | | | | |
| | RTWP | 0 | 0 | 0 | 0 | 0 | 0 | 1 | 1 | 1 | 0 | 0 | | | | | |
| | RSET | 0 | 0 | 0 | 0 | 0 | 0 | 1 | 1 | 0 | 1 | 1 | | | | | |
| | IDLE | 0 | 0 | 0 | 0 | 0 | 0 | 1 | 1 | 0 | 1 | 0 | | | | | |
| | | 0 | 0 | 0 | 0 | 0 | 0 | 1 | 1 | 0 | 0 | 1 | | | | | |
| | LIMI | 0 | 0 | 0 | 0 | 0 | 0 | 1 | 1 | 0 | 0 | 0 | | | | | |
| | LWPI | 0 | 0 | 0 | 0 | 0 | 0 | 1 | 0 | 1 | 1 | 1 | 0 | 0 | 0 | 0 | 0 |
| | STST | 0 | 0 | 0 | 0 | 0 | 0 | 1 | 0 | 1 | 1 | 0 | | | | | |
| | STWP | 0 | 0 | 0 | 0 | 0 | 0 | 1 | 0 | 1 | 0 | 1 | | | | | |
| | CI | 0 | 0 | 0 | 0 | 0 | 0 | 1 | 0 | 1 | 0 | 0 | | | | | |
| | ORI | 0 | 0 | 0 | 0 | 0 | 0 | 1 | 0 | 0 | 1 | 1 | | | | | |
| | ANDI | 0 | 0 | 0 | 0 | 0 | 0 | 1 | 0 | 0 | 1 | 0 | | | | | |
| | AI | 0 | 0 | 0 | 0 | 0 | 0 | 1 | 0 | 0 | 0 | 1 | | | | | |
| | LI | 0 | 0 | 0 | 0 | 0 | 0 | 1 | 0 | 0 | 0 | 0 | | | | | |

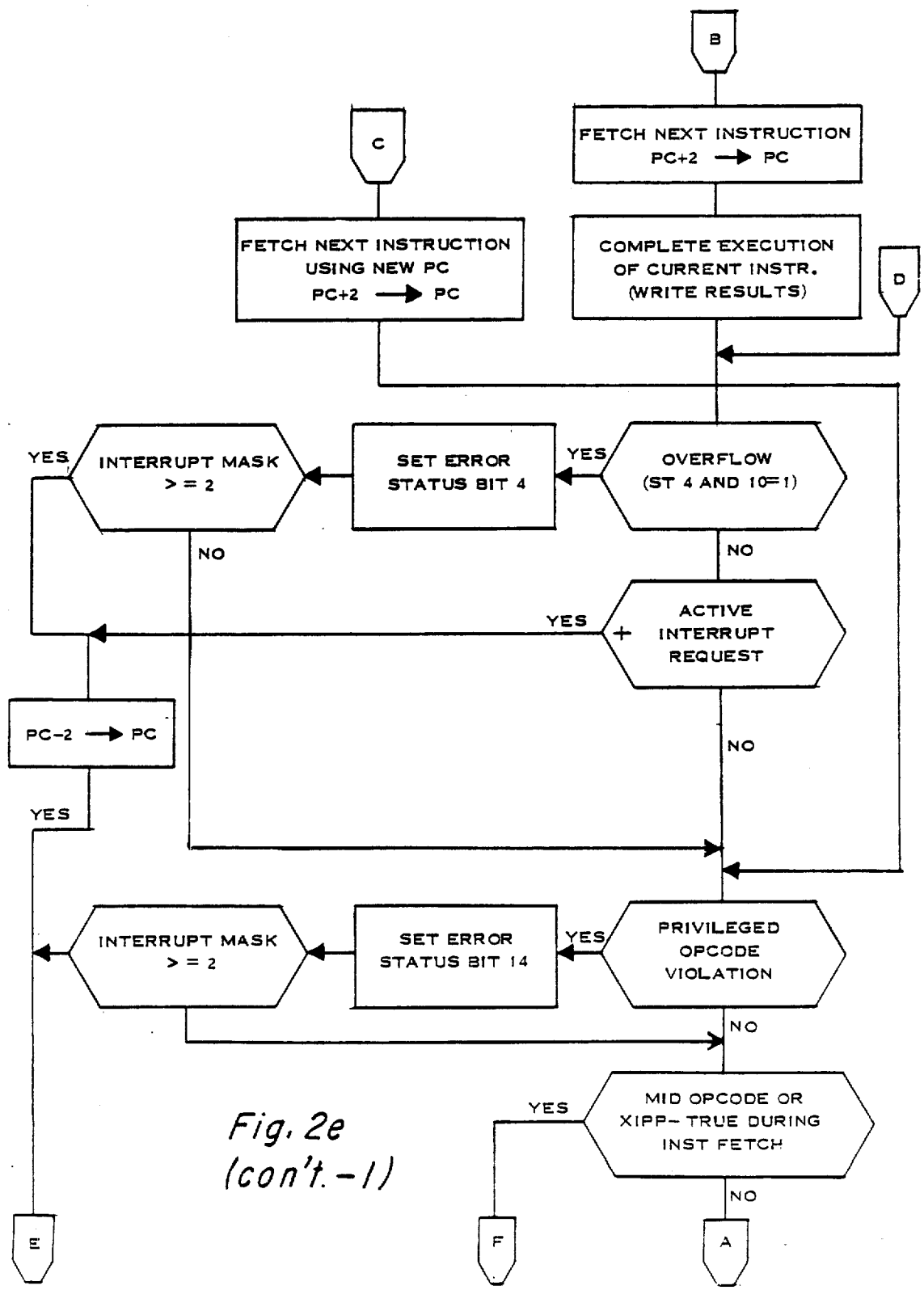
Fig. 2e (con't.-1)

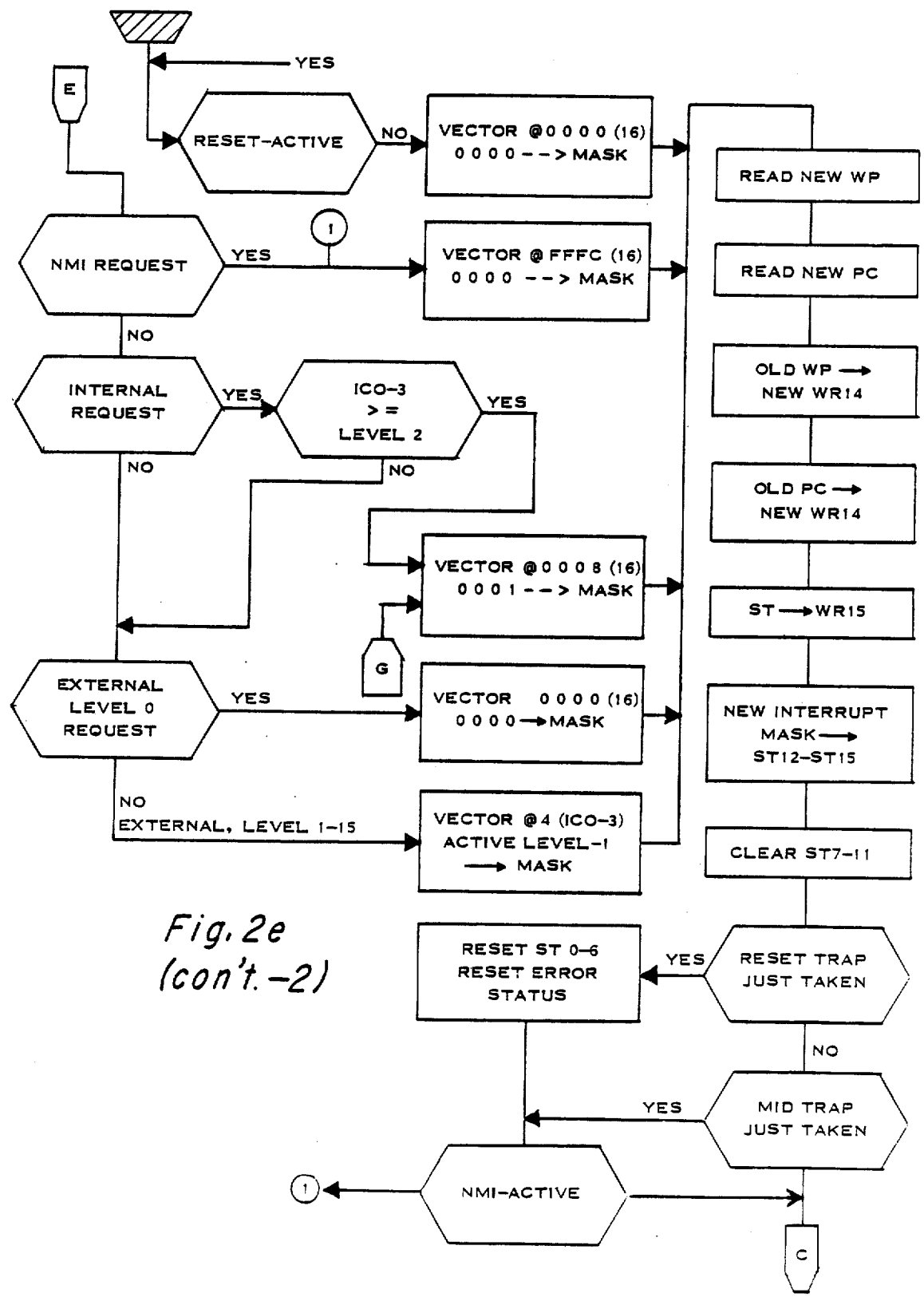
Fig. 2e (con't.-2)

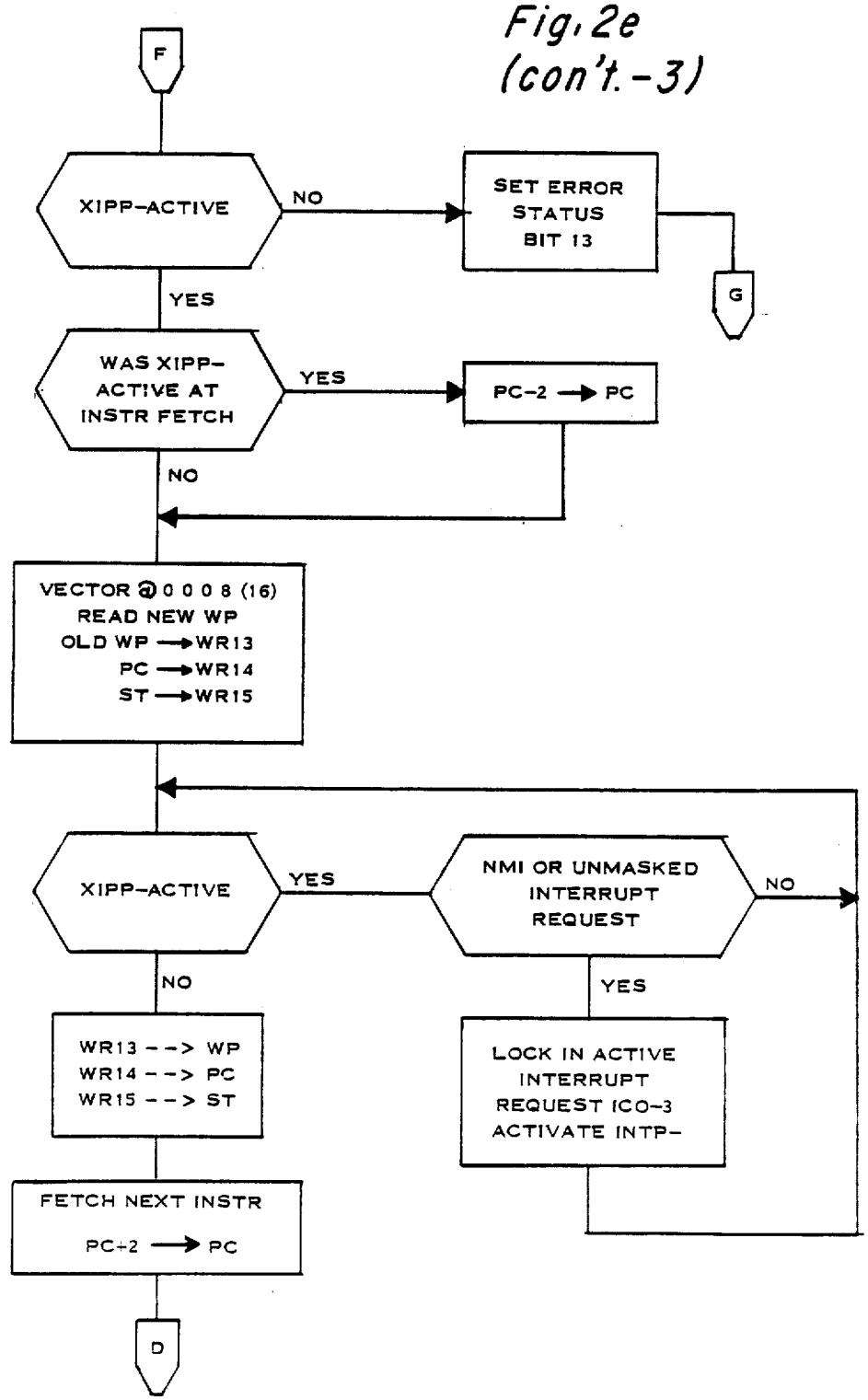
Fig. 2e (con't.-3)

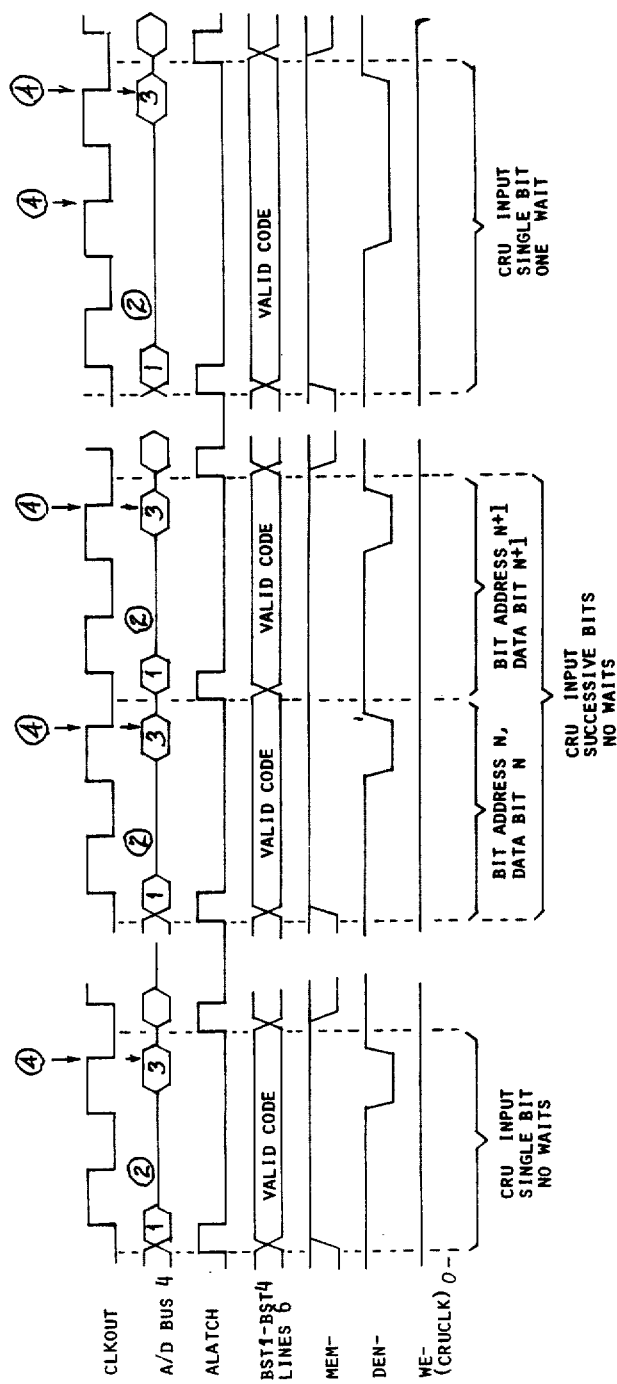

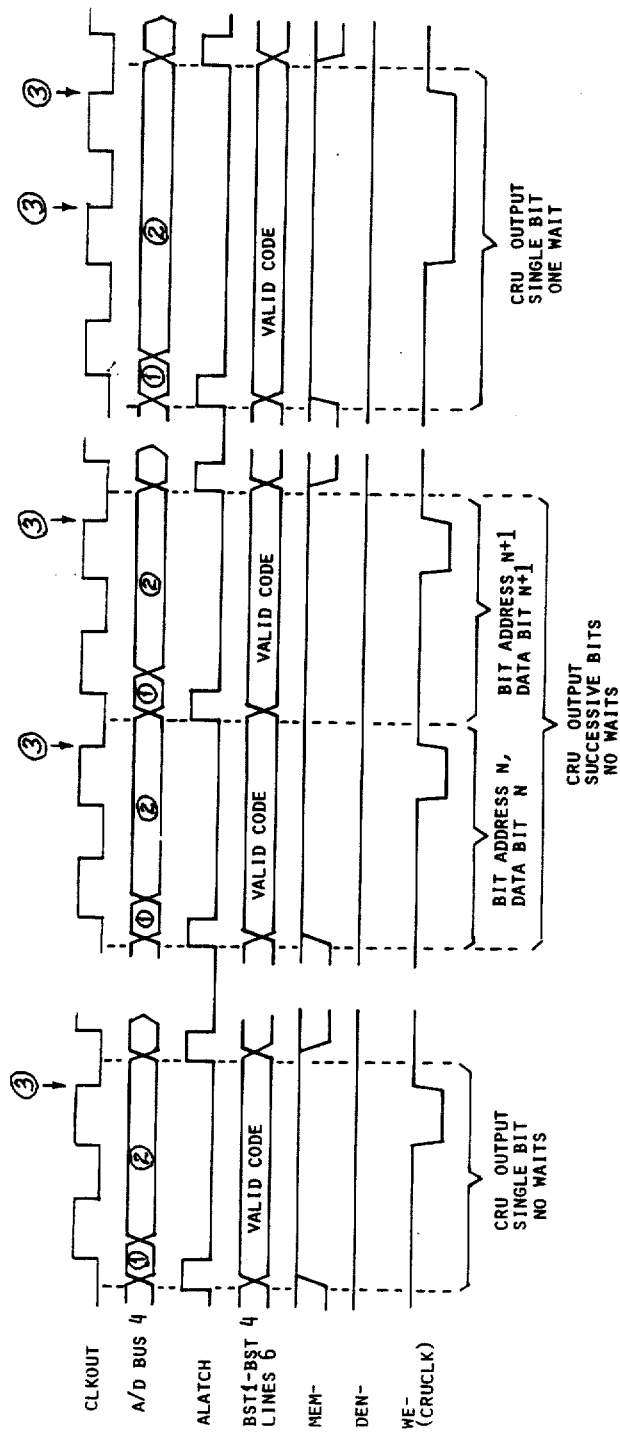
Fig. 2g CRU TIMING — OUTPUT OPERATION

SINGLE BIT CRU ADDRESS DEVELOPMENT

LDCR/STCR DATA TRANSFERS

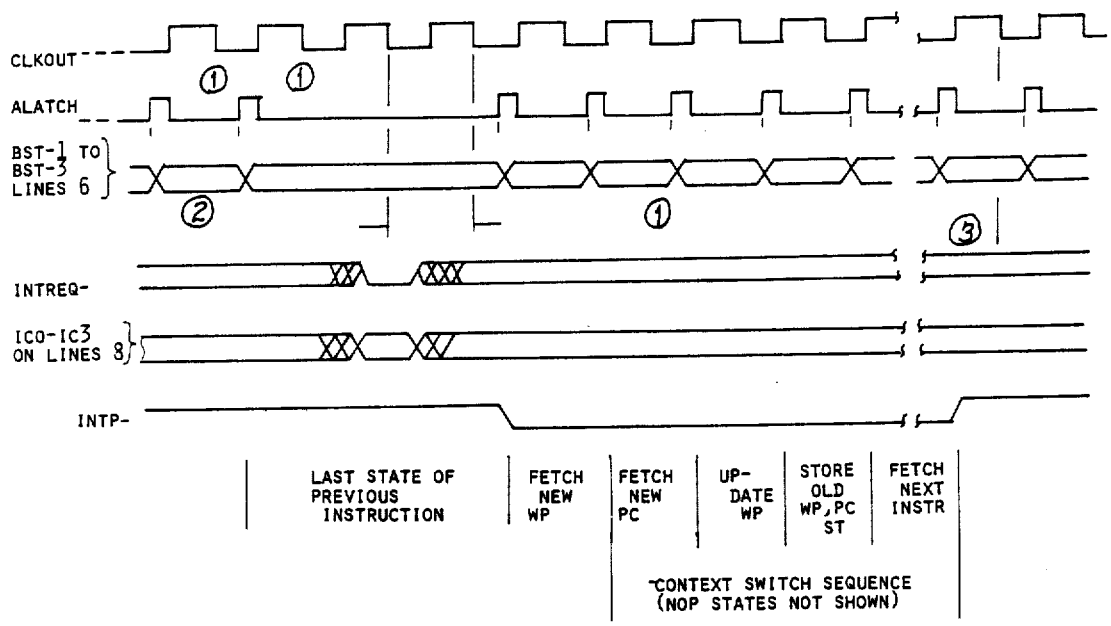
Fig. 2j
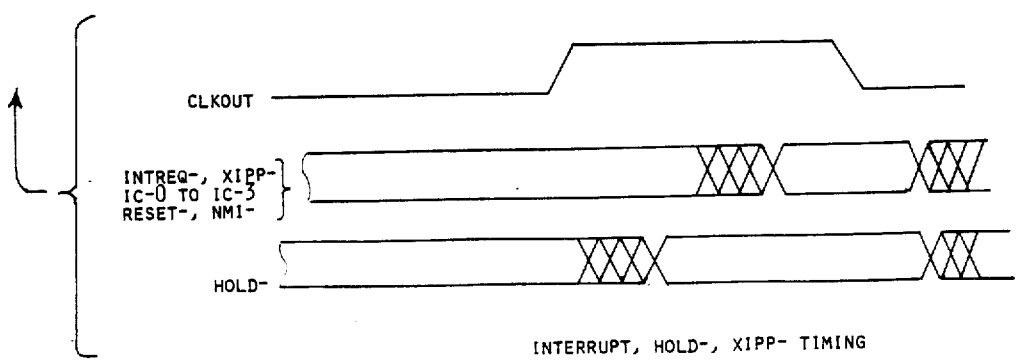

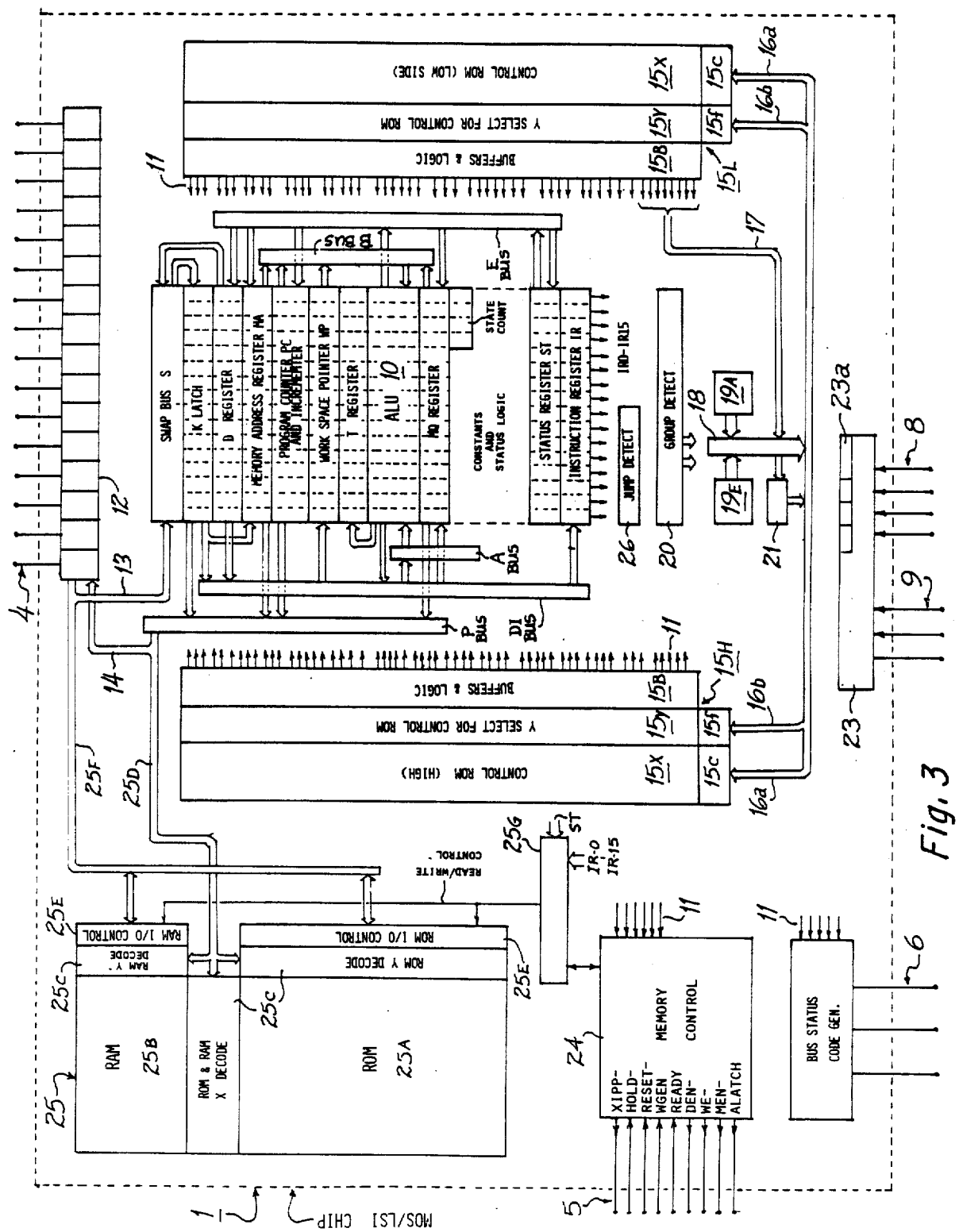

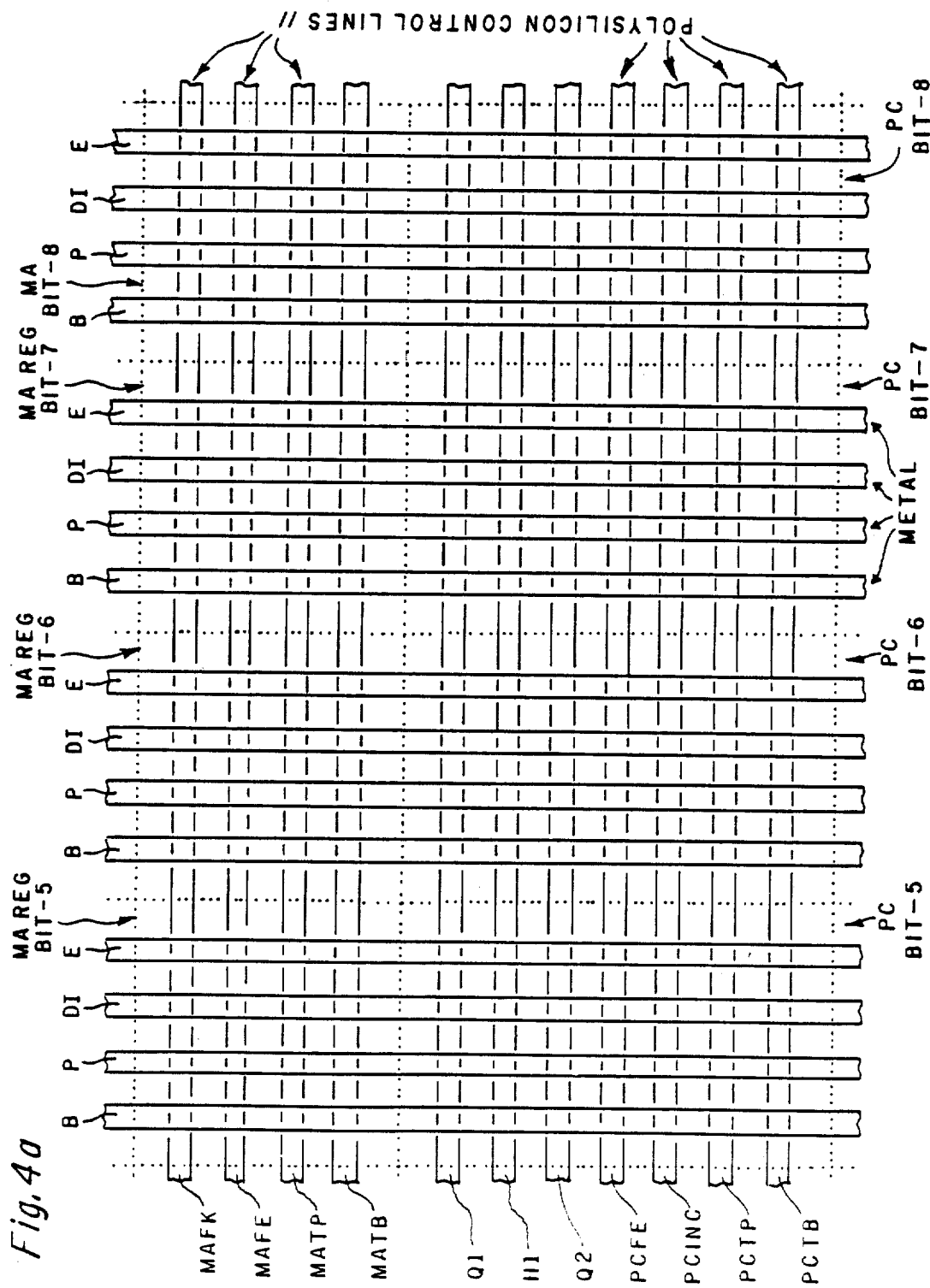

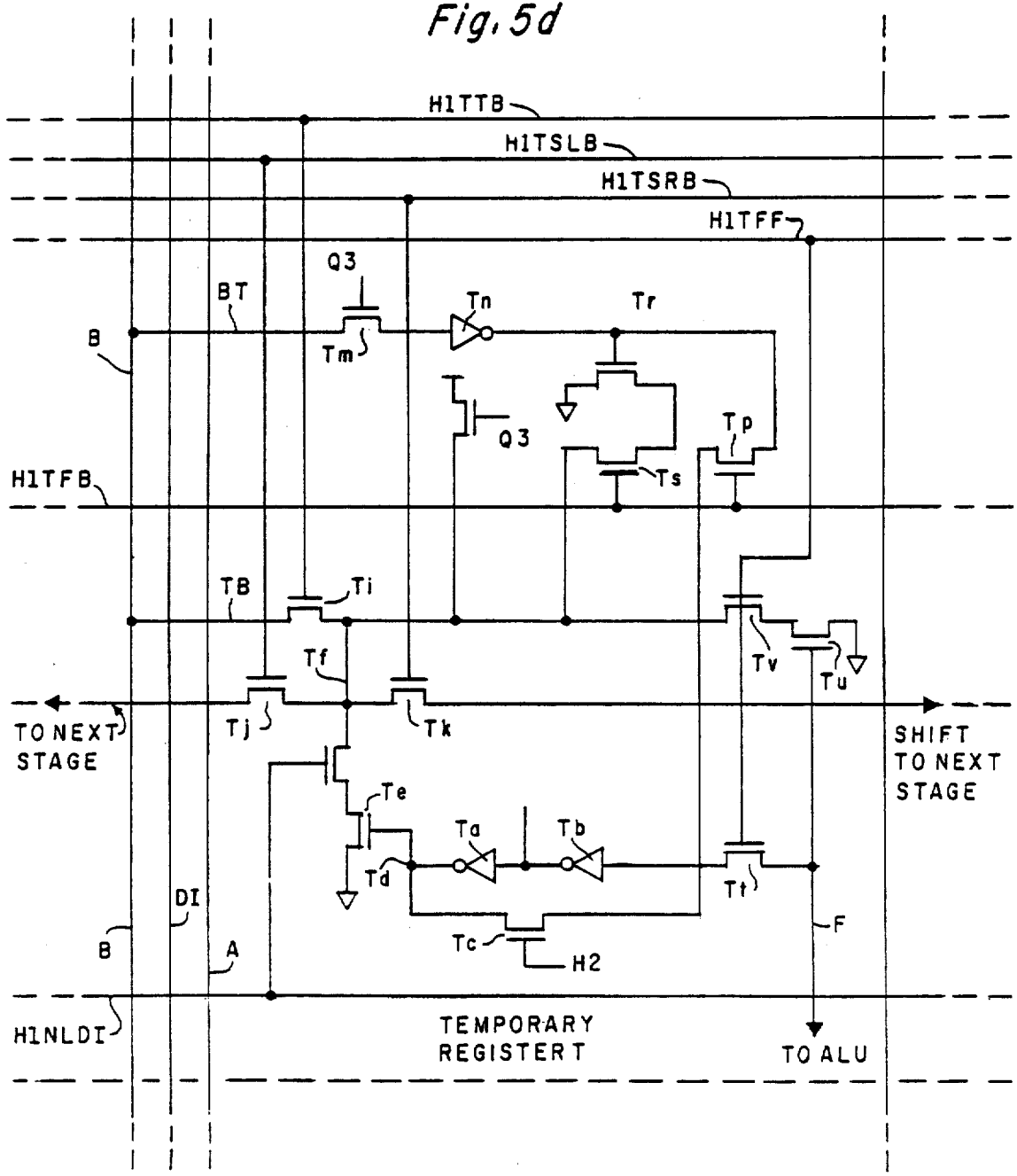

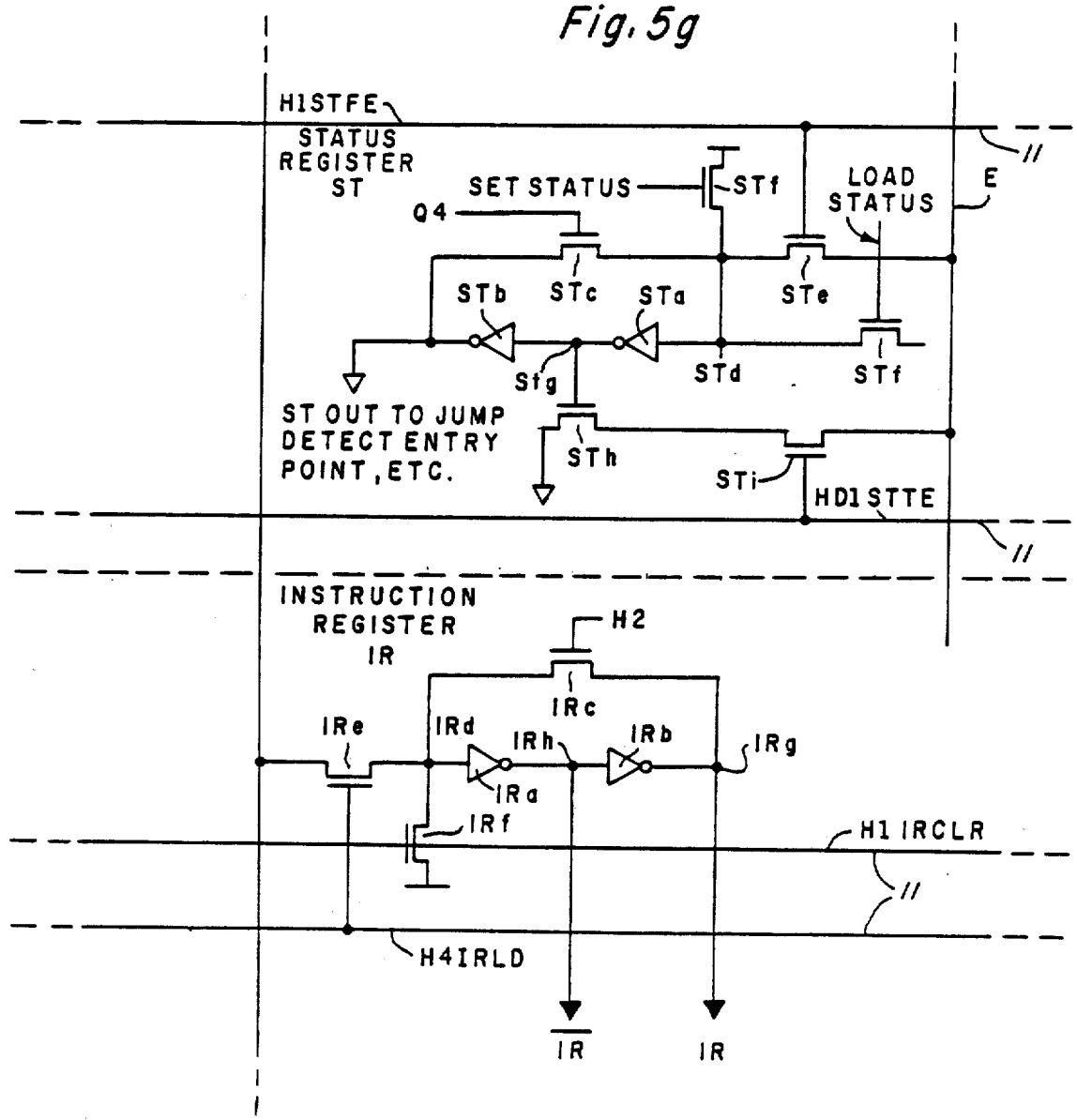

Fig. 7

| STATE TIME | OPERATION | ALU INPUTS/OUTPUT | ADDRESS/DATA BUS 4 | OTHER |
|---|---|---|---|---|
| S1 | PRE-FETCH INSTRUCTION AT ADDRESS IN PC FOR THE ADD OPERATION; PERFORM ALU OPERATION FOR OLD INSTRUCTION | PERFORMS ALU OPERATION FOR OLD INSTRUCTION, RESULT TO E BUS DELAYED | READ CYCLE; ADDRESS FROM PC OUT VIA P BUS AND BUS 4; DATA BACK IN ON BUS 4 TO K REG VIA BUS 5 | INCREMENT PC DEN-ACTIVE |
| S2 | WRITE RESULT OF OLD INSTRUCTION AT OLD INSTRUCTION ADDRESS; CALCULATE SOURCE ADDRESS FOR NEW INSTRUCTION | ADDS 2S + WP; A INPUT IS S FIELD FOR INCOMING INSTRUCTION WORD OFF DI BUS; B INPUT IS WP VIA B BUS OUTPUT TO E, DELAYED | WRITE CYCLE; DEST. ADDRESS FOR OLD INSTRUCTION ON BUS 4 FROM MA, THEN DATA OUT ON BUS 4 FROM D REG. | LOAD IR VIA DI BUS AND DETERMINE ENTRY POINT FOR ADD INSTRUCTION |
| S3 | FETCH SOURCE OPERAND AT ADDRESS IN MA; CALCULATE ADDRESS OF DESTINATION REGISTER | ADDS 2D + WP A INPUT IS D FIELD FROM INSTRUCTION B INPUT IS WP RESULT TO MA VIA E DELAYED | READ CYCLE; SOURCE ADDRESS OUT FROM MA TO BUS 4; DATA BACK IN ON BUS 4 TO K REG. | DEN-ACTIVE |
| S4 | FETCH CONTENTS OF DESTINATION REGISTER | ADDS 2D + WP AGAIN; RESULT TO MA TO BE USED AS THE DESTINATION WRITE | READ CYCLE; ADDRESS (2D + WP) GOES OUT, CONTENTS OF THAT ADDRESS BACK IN TO BE USED FOR NEXT FETCH | DEN-ACTIVE |
| S5 | FETCH DESTINATION OPERAND | ADDS K PLUS ZERO AND STORES RESULT IN T REG. | READ CYCLE; DESTINATION ADDRESS FROM MA GOES OUT ON BUS 4; DEST. OPERAND COMES BACK ON BUS 5 INTO K REG. | DEN-ACTIVE |
| S6 | PERFORM THE ADD OPERATION FOR THIS INSTRUCTION, AND PRE-FETCH THE CONTENTS OF ADDRESS IN PC FOR THE NEXT INSTRUCTION | PERFORMS ADD OPERATION FOR CURRENT ADD INSTRUCTION; A INPUT IS FROM K, B INPUT IS FROM T VIA F, OUTPUT TO E DELAYED | READ CYCLE; ADDRESS FOR NEXT INSTRUCTION OUT VIA P BUS AND BUS 4; DATA BACK IN ON BUS 5 TO K REG. VIA BUS 5 | INCREMENT PC DEN-ACTIVE |
| S7 | WRITE RESULT OF THIS ADD OPERATION AT DESTINATION ADDRESS; CALCULATE SOURCE ADDRESS FOR NEXT INSTRUCTION | ADDS 2S + WP FOR NEXT INSTRUCTION | WRITE CYCLE; DESTINATION ADDRESS FOR ADD INSTRUCTION GOES OUT ON BUS 4 FROM MA, THEN DATA ON TO BUS 4 FROM D REG. | LOAD IR VIA DI BUS AND DETERMINE ENTRY POINT FOR NEXT INSTRUCTION |

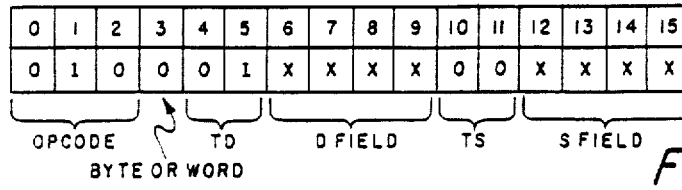

| STATE TIMES; MICROCODE LABEL | CROM 15 ADDR. | OPERATION | ALU | BUS STATUS CODE |
|---|---|---|---|---|
| SCALX |  | Fetch Source Operand | Add 2D+WP |  |
| SDIV1 | 06 | Calculate address of half of operand | Add 2+WP | 001 |
| 2 | A2 | Fetch Reg. 1 ə MA | K twos complement result to D | 110 |
| 3 | 9D | Address of other half of operand | Add zero to WP | 001 |
| 4 | D4 | Fetch Reg. 0 ə MA | Add zero to K, result to T | 110 |
| 5 | C1 | Negate contents of D reg. | Neg. D, result to D | 001 |
| 6 | C2 |  | Subtract 0 from T with Carry, result to MQ | 001 |
| 7 | CD |  | K , one's complement result to T | 001 |
| 8 | C7 |  | Add D + T | 001 |
| 9 | 5D | Check if result 16 bits |  | 001 |
| * 10 | C4 | Divide, increment SC | Add D to shift-left T result to T | 001 |
| * 11 | C5 | Divide, increment SC | Add D to shift-left T, result to T | 001 |
| 12 | C0 | MQ to D |  | 001 |
| 13 | C6 |  | Add zero to T | 001 |
| 14 | AF |  | D two's complement, result to D, MQ | 001 |
| 15 | A7 | Subtract zero from T, with carry | 0 CSUB T, result to MQ | 001 |
| 16 | A6 |  | Add zero to D, result to D |  |
| 17 | AD | Generate Address for | Add 2 to MA, result to MA, increment PC | 110 |
| 18 | BE |  | Increment PC Add 0 to MA | 011 |
| DW1 |  | Destination Write |  |  |

* ONE OF THESE REPEATS SIXTEEN TIMES, HOLDING CROM 15 ADDRESS IN REGISTER 21, PERFORMING A SINGLE-STATE DIVIDE EACH TIME THEN LEFT-SHIFTING

OFF-CHIP ACCESS FOR PSUEDO-MICROPROGRAMMING IN MICROPROCESSOR

RELATED CASES

This application discloses subject matter also disclosed and claimed in copending applications Ser. No. 906,914 (now U.S. Pat. No. 4,402,042), Ser. No. 209,915 (now U.S. Pat. No. 4,402,043) Ser. No. 209,917, Ser. No. 210,105 (now U.S. Pat. No. 4,403,284), Ser. No. 210,106, Ser. No. 210,108, and Ser. No. 210,109 (now U.S. Pat. No. 4,402,044) all filed herewith and assigned to Texas Instruments.

BACKGROUND OF THE INVENTION

This invention relates to integrated semiconductor devices and systems, and more particularly to features used in an electronic digital processing system which may employ a single-chip microprocessor or microcomputer device.

A description of the prior art is contained in U.S. Pat. No. 4,042,044, incorporated herein by reference.

It is the principal object of the invention to provide an improved microprocessor device and system, and an improved method of constructing and operating such apparatus. Another object is to provide improved performance or capabilities of a microprocessor or microcomputer while at the same time reducing the size (and thus cost) of the semiconductor device needed to implement the desired features. Further objects are to provide: a technique for executing instruction sequences in a microprocessor to emulate complex instructions which are indistinguishable from native instructions; a microprocessor which may be customized without employing micro-code programming; one which has on-chip memory, not included in the main memory map, for executing complex instructions; and improved emulator capability in a microcomputer.

SUMMARY OF THE INVENTION

In accordance with one embodiment of the invention, an improved single-chip microprocessor device of the MOS/LSI type contains an ALU, internal busses, address/data registers, and an instruction register with control decode or microcontrol generator circuitry. The device communicates with external memory and peripherals by a bidirectional multiplexed address/data bus and control lines. In addition to the main off-chip memory, a small on-chip memory not in the main memory map (including both ROM and RAM) allows execution of instruction sequences to emulate complex instructions or interpretors (macro-instructions) indistinguishable from "native" instructions; all memory fetches are generated the same way as for main memory, and long instruction sequences are interruptable. In addition, off-chip access separate from main memory allows emulation and the like.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 3 is an electrical diagram in block form of a MOS/LSI microprocessor chip including a CPU or central processor unit employed in the microprocessor system of FIG. 1 and utilizing features of the invention;

DETAILED DESCRIPTION OF SPECIFIC EMBODIMENT

Microprocessor System

Figure 1:
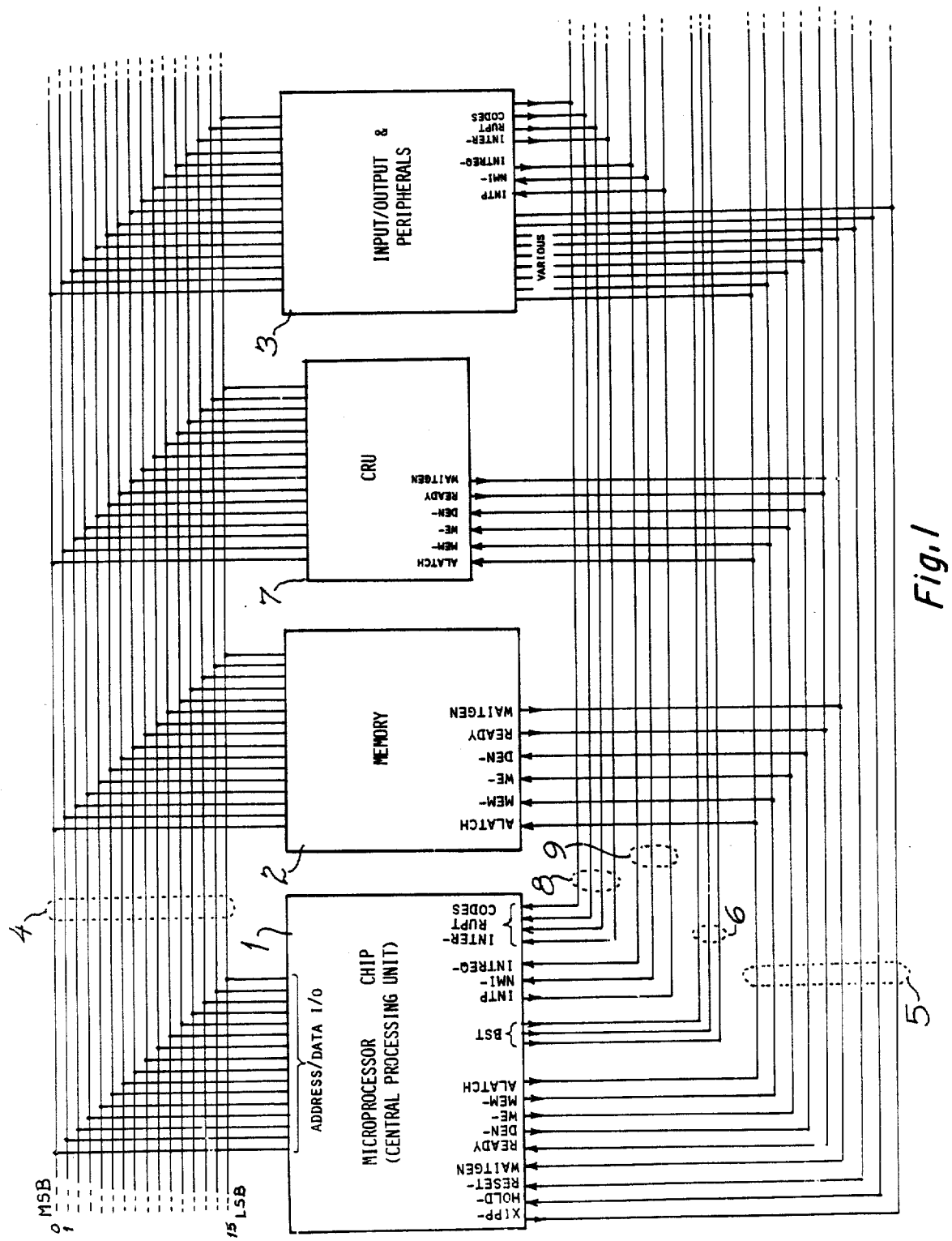
FIG. 1 is an electrical diagram in block form of a microprocessor system which may employ features of the invention.

The microprocessor device to be described herein may be of various configurations; in one embodiment the microprocessor device may be used in a system shown in generallized form in FIG. 1. The system may be, for example, a single-board general purpose microcomputer, a word processing system, a computer terminal with display and typewriter keyboard, a communications switching or processing system, or any of many applications of this type. The system includes a single-chip MOS/LSI central processing unit or microprocessor 1 which will be described in detail, along with a memory 2 and input/output or I/O device 3. The microprocessor, memory and I/O communicate with one another by a 16-bit, parallel, bidirectional, multiplexed address/data bus 4, along with control lines 5. Suitable supply voltage and clock terminals are included; for example the device may employ a single +5 V Vcc supply and ground or Vss, and a crystal may be connected to terminals of the device 1 to control the frequency of an on-chip oscillator which will then define the system timing. It is understood that concepts of the invention may be used in a single-chip microcomputer with on-chip memory instead of the off-chip memory 2, as well as in a microprocessor having separate address and data busses instead of the bidirectional bus 4.

In general terms, of course, the system of FIG. 1 functions in traditional manner. The microprocessor 1 fetches an instruction by sending out an address on the bus 4 to the memory 2 then receiving the instruction via the bus 4 from the addressed location in the memory 2. The microprocessor then executes this instruction, which usually requires several machine cycles (as defined by a clock or crystal) including sending out via bus 4 addresses for the operands stored in the memory 2, and receiving this data back on bus 4, as well as writing a result into memory 2 by an address followed by data on the bus 4. The I/O devices 3 may be addressed like memory 2; this interface to external devices is accomplished using the address/data bus 4 and control lines 5 since the I/O devices 3 occupy locations in the memory address space. This is known as memory-mapped I/O.

Figure 2A:
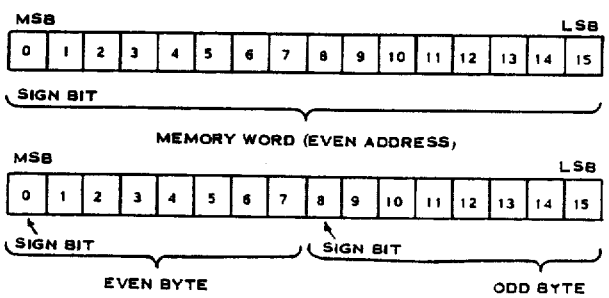
FIG. 2a is a diagram of the word, byte and bit definitions of the 16-bit data word used in the system of FIG. 1.

In the example to be described in detail, a 15-bit address is applied to the bus 4 from the microprocessor 1 (the 16th bit is a hardwired 0 for addressing), which will directly address $2^{15}$ or 32K words of memory. Each 16-bit word in memory includes two 8-bit bytes, so the microprocessor can address 64K bytes. The instruction set of the microprocessor 1 allows either word or byte operations. FIG. 2a shows the data word and byte formats and bit definitions for the system of FIG. 1 as described herein. Words are assigned even numbered addresses in memory 2. A 16-bit byte address is explicitly manipulated by all addressing modes, internally, but only the 15-bit word address is provided to the memory system 2 via bus 4, providing direct addressing of a 32K word memory space. The CPU device 1 supports several methods of increasing the amount of physical memory space which it can address, including paging, functional separation and mapping. Paging is accomplished by using a status bit on one of the control lines 5 as a 16th address bit. Functional separation is accomplished using "bus status codes" on BST lines 6 to enable separate memory spaces for instructions or data. Mapping is accomplished by using external map logic devices which are managed by mapping instructions; this may extend the physical address range to 16M bytes or $2^{24}$, meaning the equivalent of a 24-bit address.

Figure 2B:
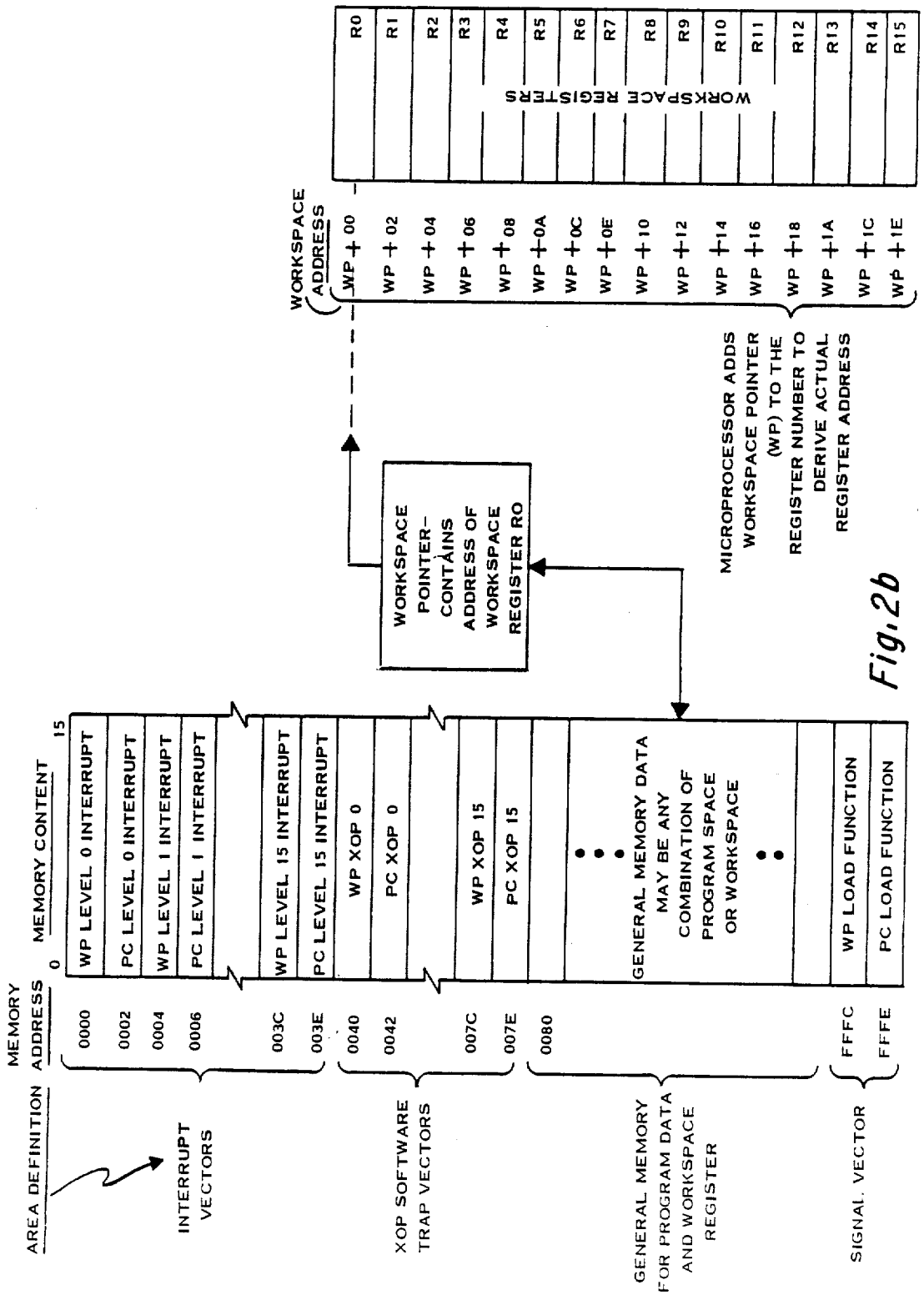
FIG. 2b is a memory map for the main memory 2 of FIG. 1 and a diagram of a number of adjacent memory locations in the general memory area referred to as a "workspace"
Figure 2D:
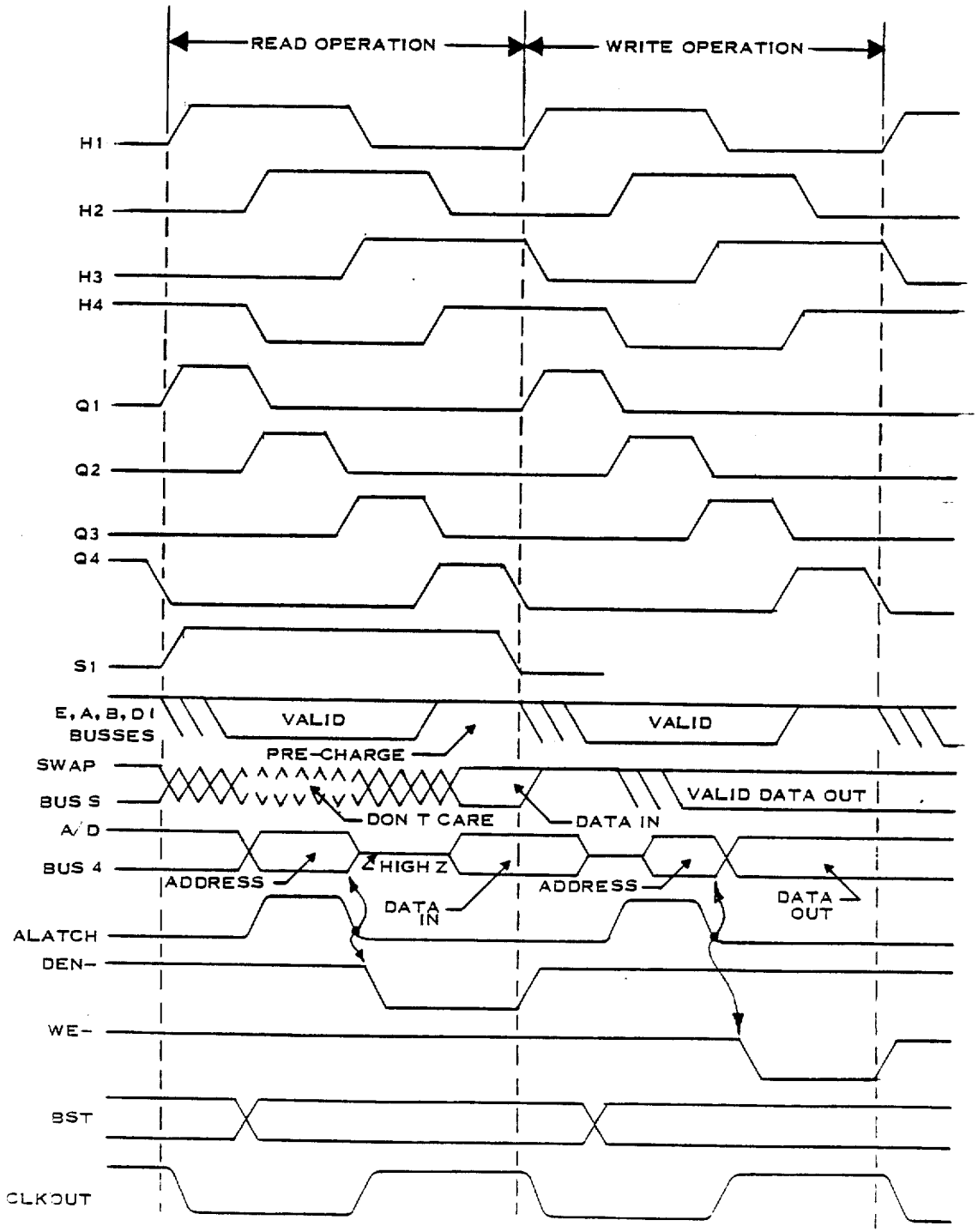

The system of FIG. 1 employs a memory-to-memory architecture in which the register files or working registers used by the CPU reside in the external memory 2 rather than in the microprocessor chip 1. This type of architecture allows faster response to interrupts and increased programming flexibility, compared to the traditional method of having most operands and return addresses stored in registers on the chip 1. The bulk of memory 2, particularly addresses 0080 to FFAA (all addresses are given in hexidecimal or base-16 in this description), is available for program storage or for "workspaces" as seen in FIG. 2b. The first word of a workspace is addressed by a workspace pointer (always an even address) and the remaining fifteen words are addressed by the workspace pointer plus 02 up to 1E (a 4-bit binary address). By maintaining the working registers in memory 2, a context switch or interrupt can be executed with a minimum of data transfer between microprocessor 1 and memory 2 because most of the data to be saved is already in the memory 2.

In addition to the parallel I/O 3, the system includes a bit-addressable input/output capability using a communications register unit or "CRU" 7 which employs one of the terminals (bit-0) of the address/data bus 4 as an input and another (bit-15) as an output, along with the lines 5 as control.

Interrupts are provided by four input lines 8 which define sixteen interrupt codes, sampled by the CPU 1 when an interrupt request line (one of three interrupt controls among the lines 9) is active and compared internally with an interrupt mask. If the code on the lines 8 is equal to or higher in priority than the mask, the interrupt sequence is initiated. If the comparison fails, the processor ignores the request. Another one of the control lines 9 produces a non-maskable interrupt, wherein priority codes on lines 8 are not material.

The system permits direct memory access (DMA) in which large blocks of memory words may be transferred via bus 4 between memory 2 and an I/O device 3 such as a disc memory. A "hold" command on one of the control lines 5 indicates to the processor 1 that an external controller desires to use the bus 4, so the processor enters a hold state with its terminals going to the bus 4 in a high impedance state.

A definition of the function of each of the control lines 5, bus status lines 6 and interrupt controls is given in Table A of U.S. Pat. No. 4,402,044. The status bits for a sixteen bit status register ST are shown in Table B of said Patent where the conditions for setting each bit for instructions in the instruction set are defined. A definition of the interrupt levels is given in Table C of said Patent. Of course, this specific system is merely illustrative of contemporary microprocessor or microcomputer systems in which features of the invention may be used.

The CPU chip 1 of FIG. 1 executes the instruction set of Table D of U.S. Pat. No. 4,402,044, although it is understood that other instructions could be defined for execution in addition to or in place of the particular ones described. Most of the instruction set of Table D is the same as that of a microprocessor sold by Texas Instruments under the part number TMS9900 and described in a book entitled "9900 Family Systems Design", published in 1978 by Texas Instruments Incorporated, P.O. Box 1443, M/S 6404, Houston, Tex. 77001, Library of Congress Catalog No. 78-058005; such book is incorporated herein by reference. The instructions of Table D which were not executed by the TMS9900 are: Signed Multiply and Division; long word add, substract, shift left and shift right; Branch Indirect; Branch & Push Link; long distance; Load Status and Load Workspace Pointer; Load Map File; and multiprocessor support instructions Test, Test & Clear, and Test & Set.

The source and destination addressing modes available in executing this instruction set are set forth in U.S. Pat. No. 4,402,044. Generally, the two-bit T fields Td and Ts (bits 4–5 and 10–11) define the addressing modes in instructions such as Add, Subtract, Move, Compare and the like.

The 16-bit opcodes for the instructions of Table D and FIG. 2c of U.S. Pat. No. 4,402,044, where the instructions are arranged in descending order to show the groups (based on the left-most or most-significant "1") which are used in the entry point generator circuitry as will be explained.

THE CPU CHIP

Figure 3A:
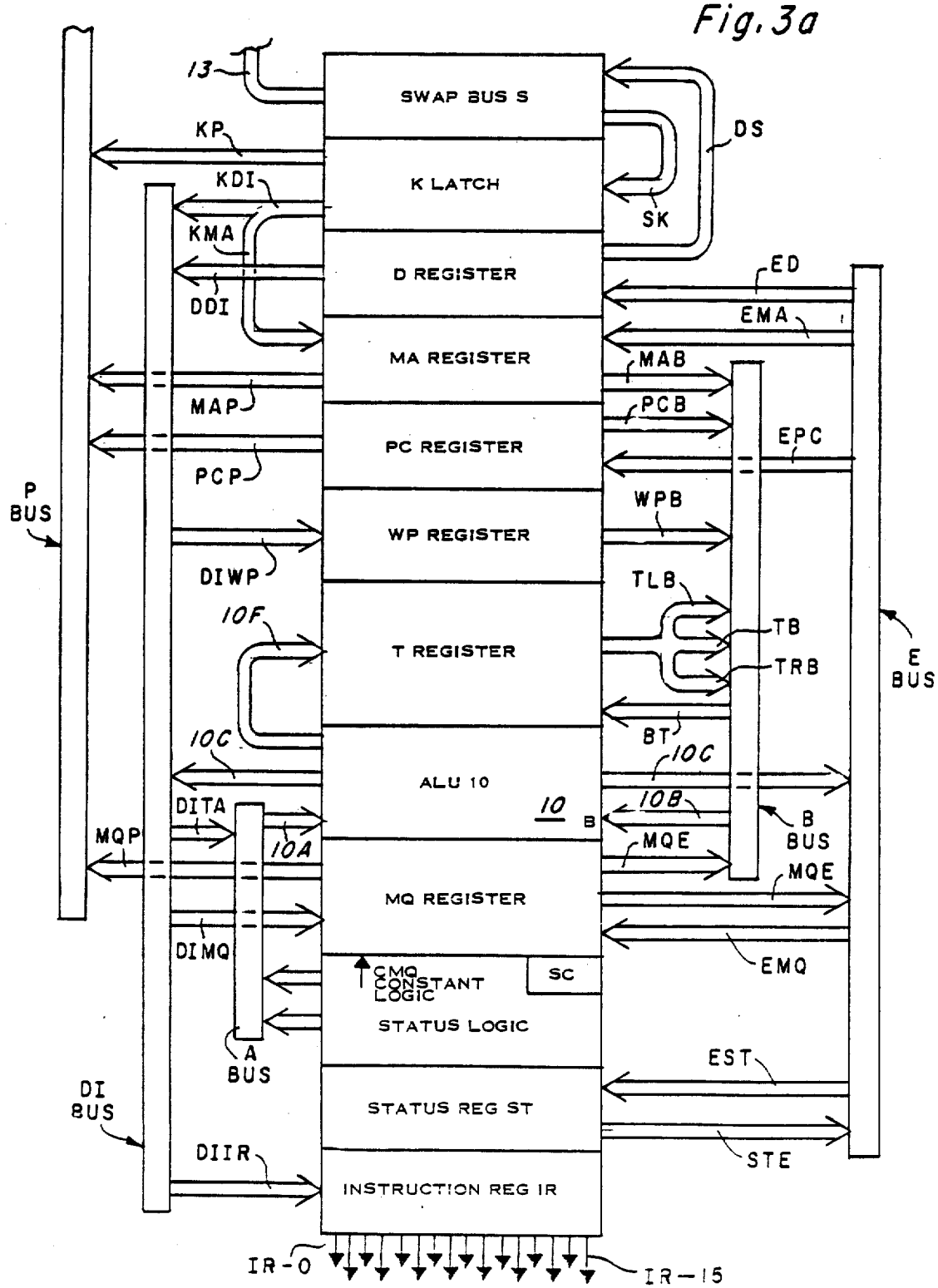
FIG. 3a is an electronic diagram in block form of the registers and busses of the microprocessor chip of FIG. 3.
Figure 4:
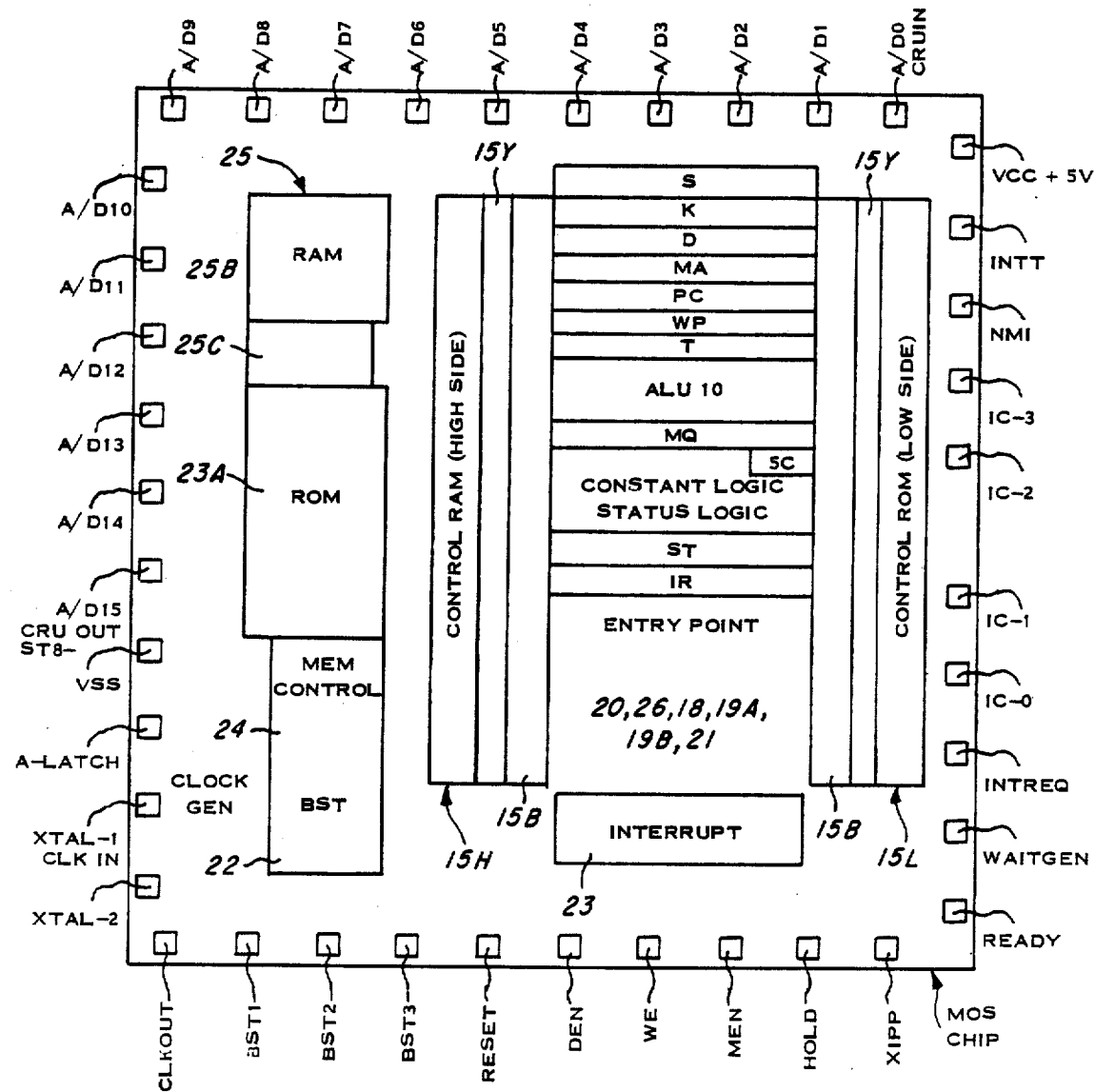
FIG. 4 is a greatly enlarged plan view of the semiconductor chip containing the microprocessor of FIG. 3 showing the physical layout of the various parts of the device.
Figure 5A:
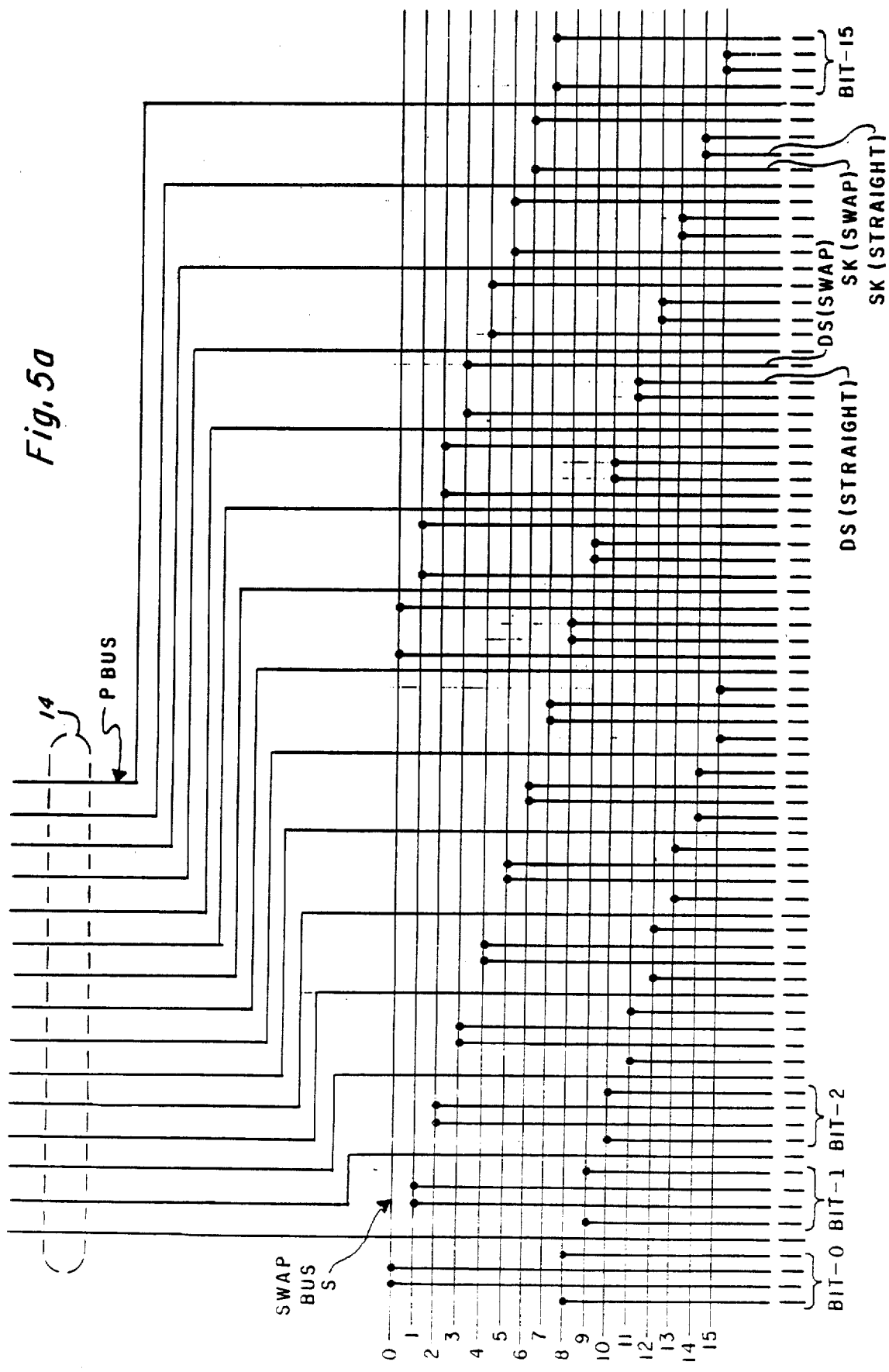
Figure 5B:
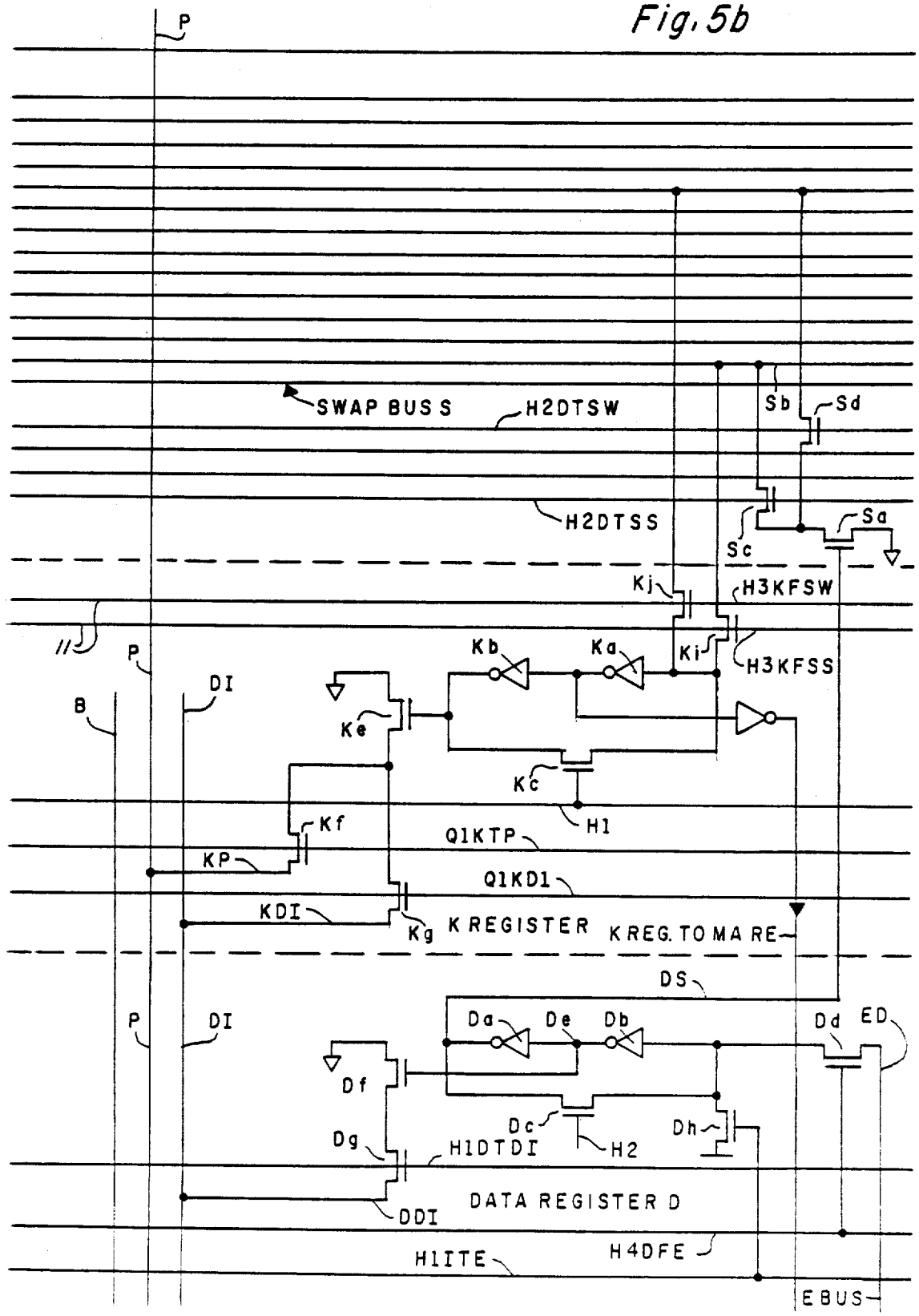
Figure 5C:
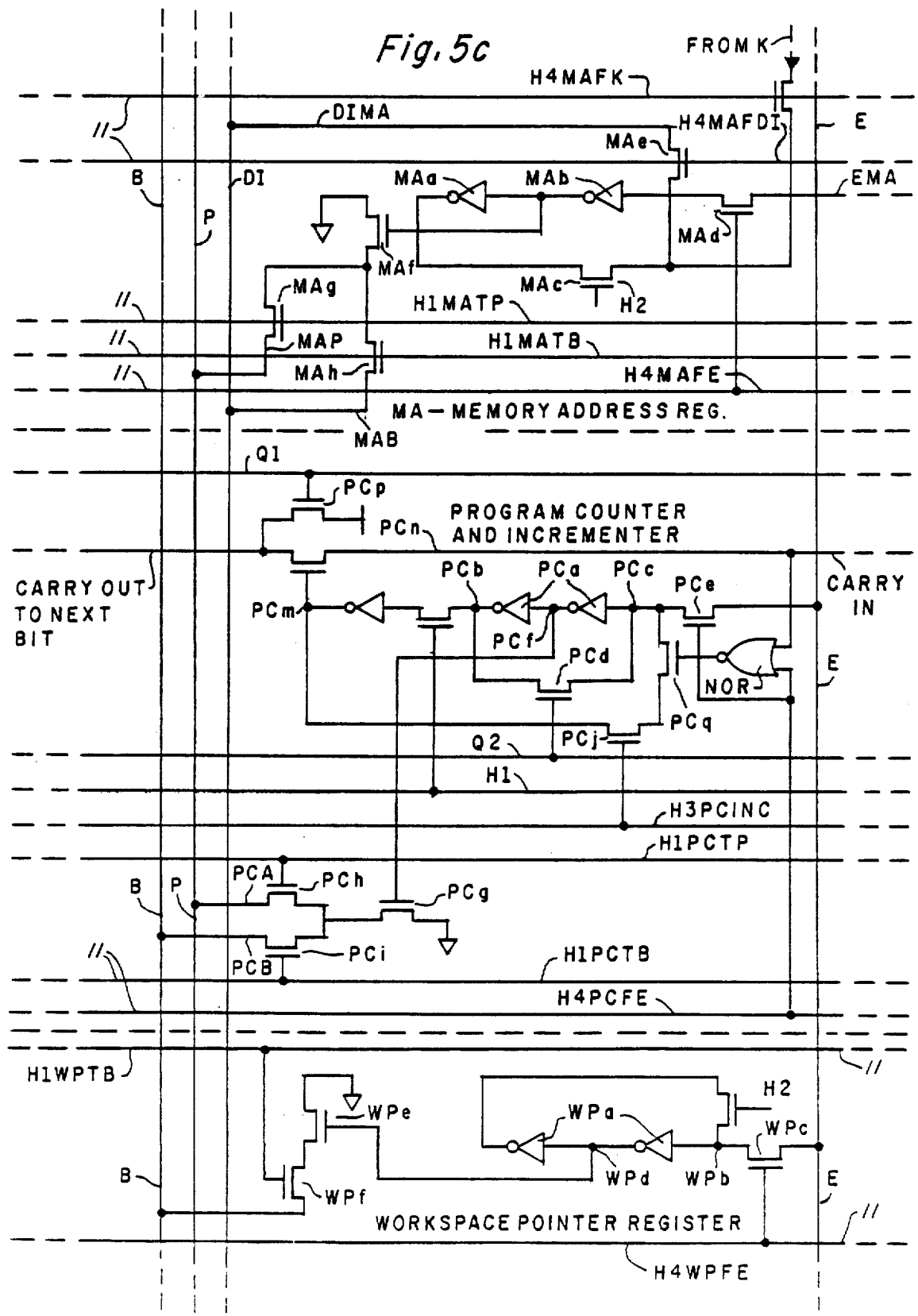
Figure 5E:
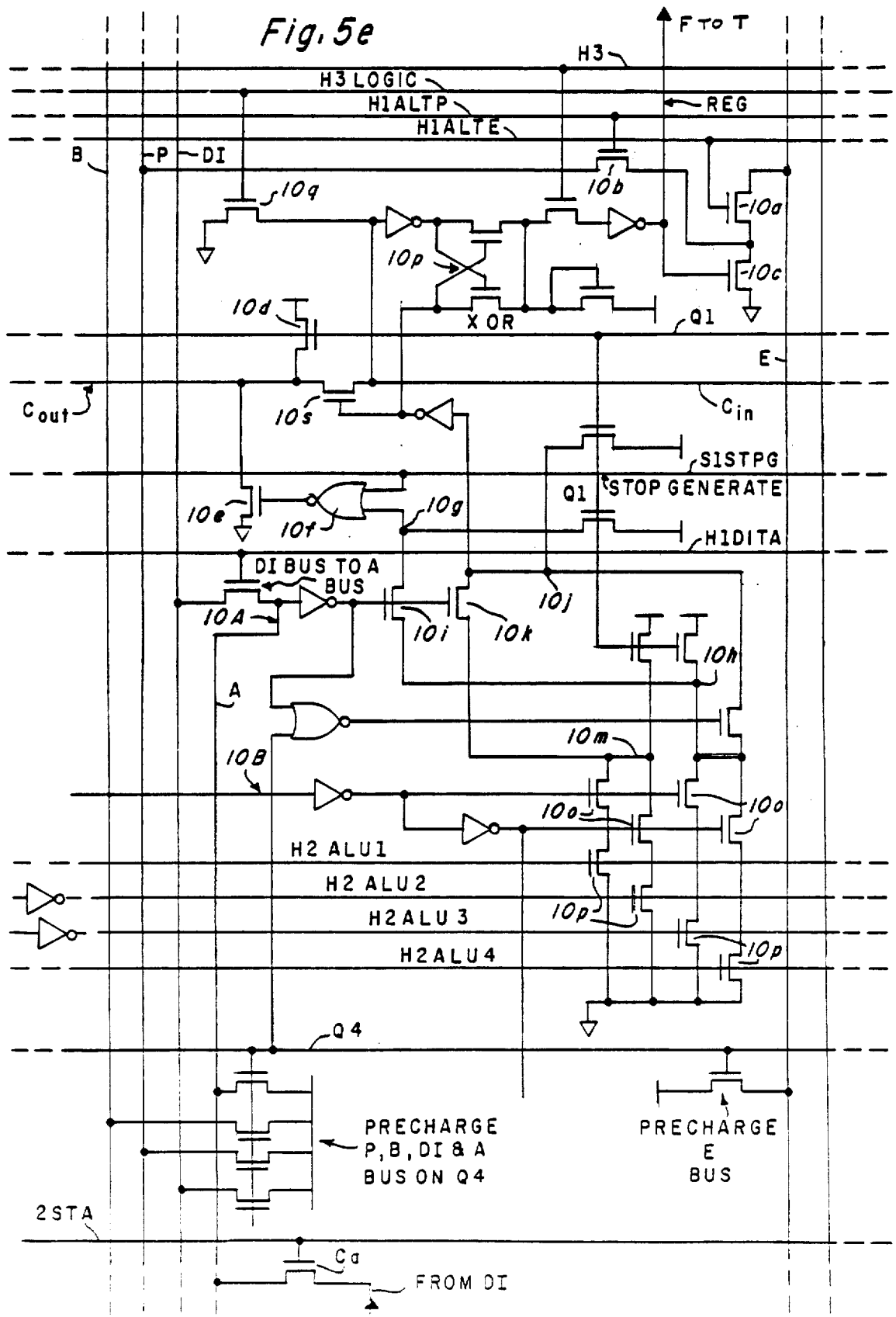
Figure 5F:
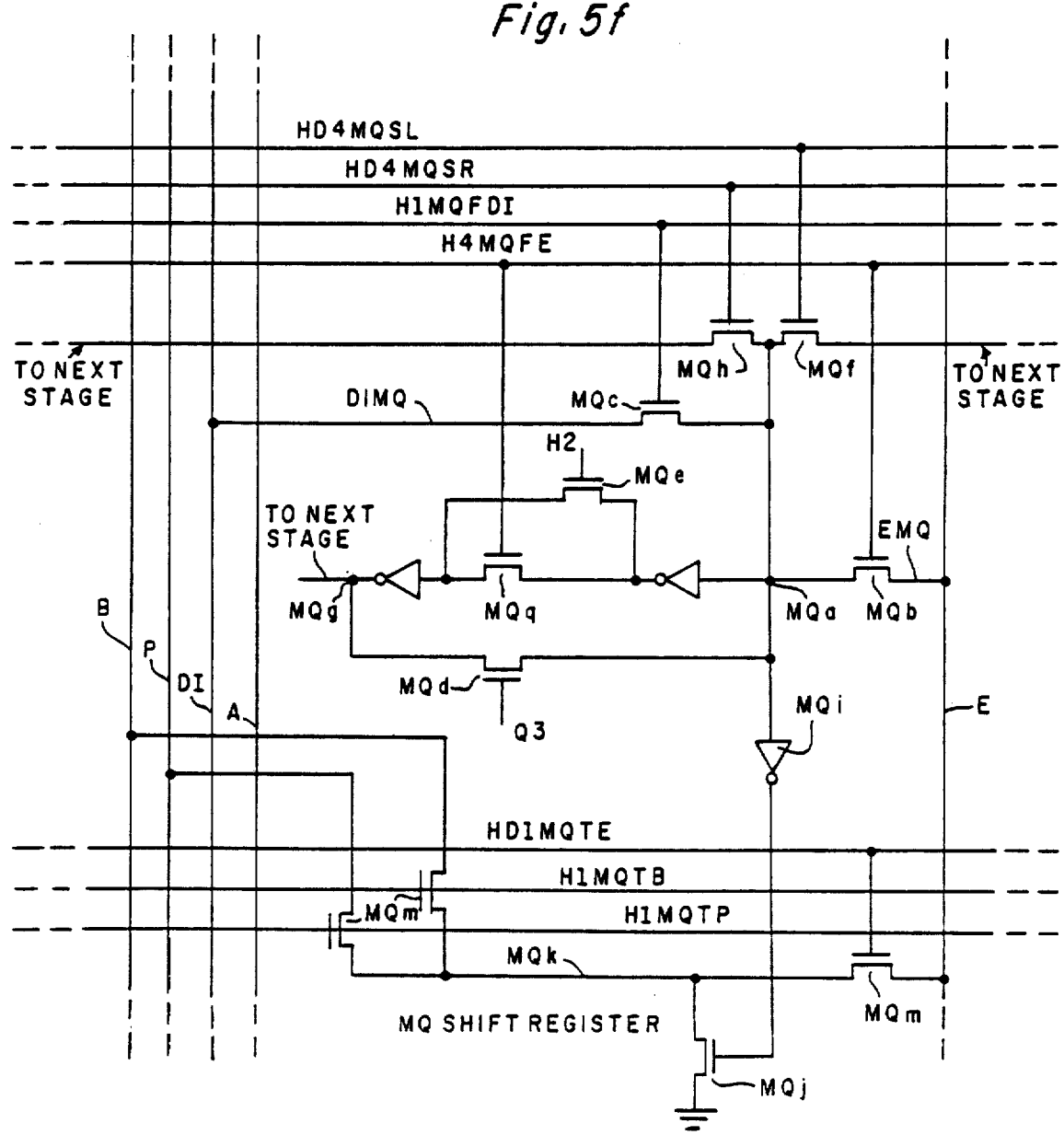
Figure 6:
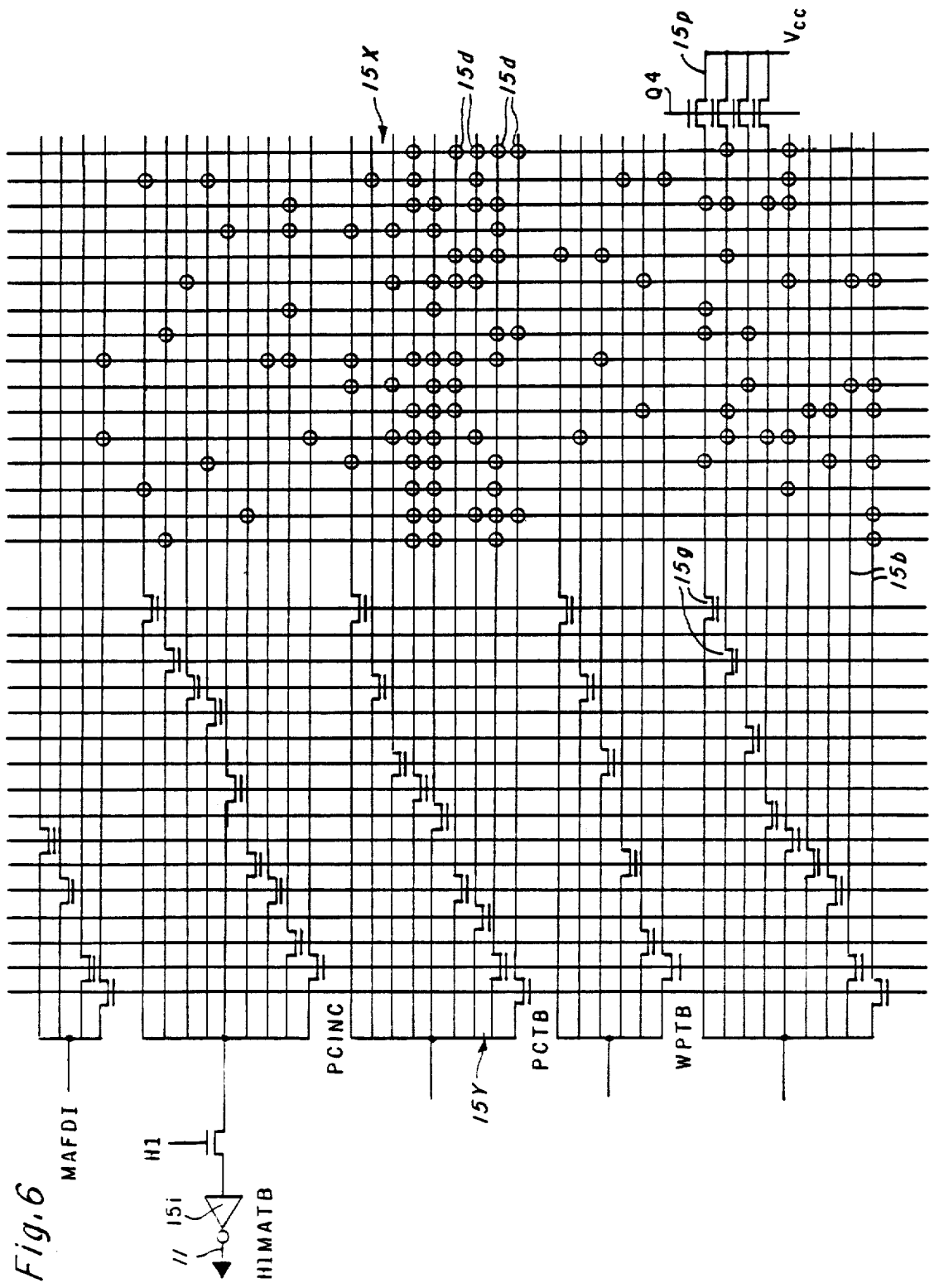
Figure 6:
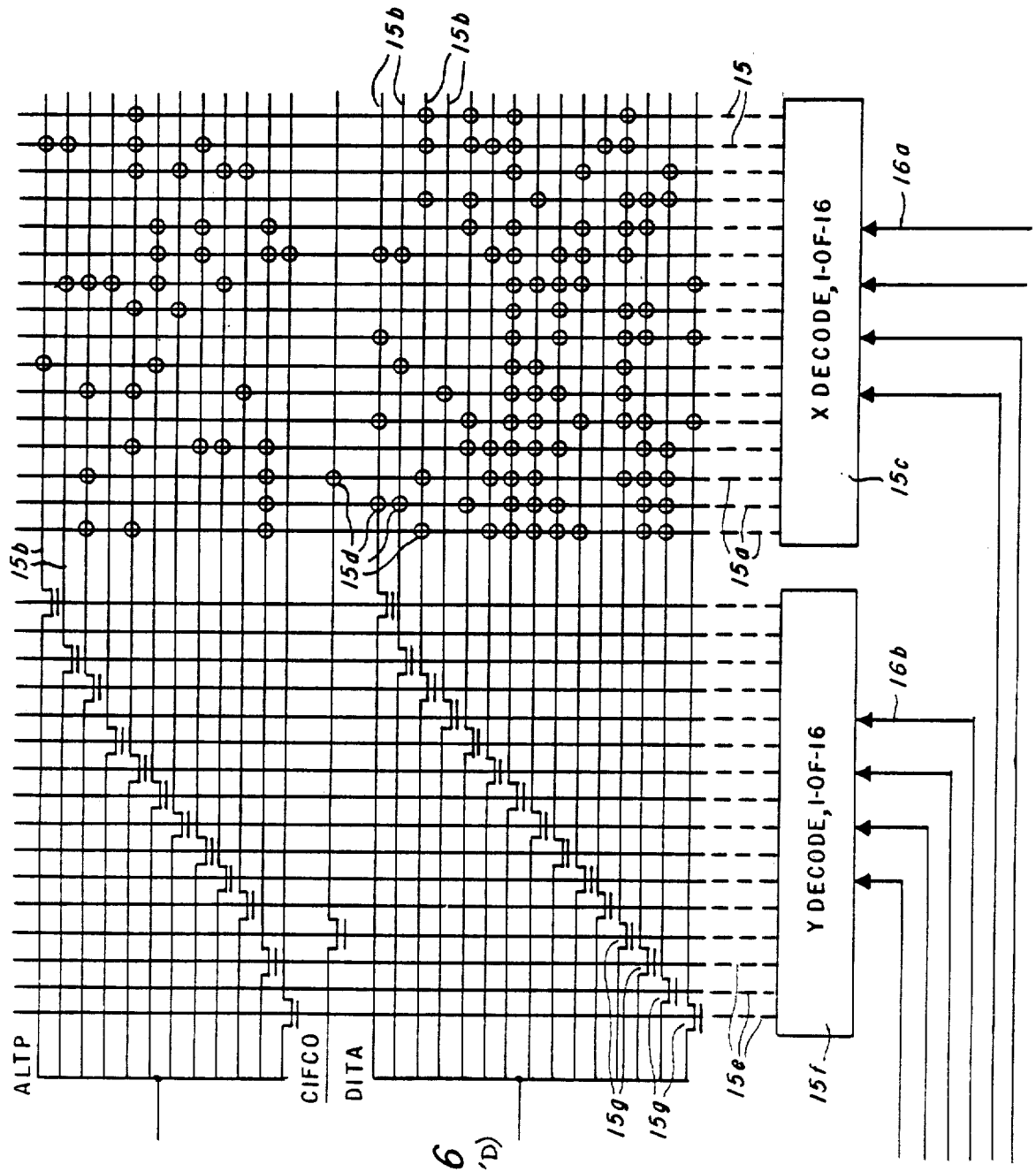
Figure 6A:
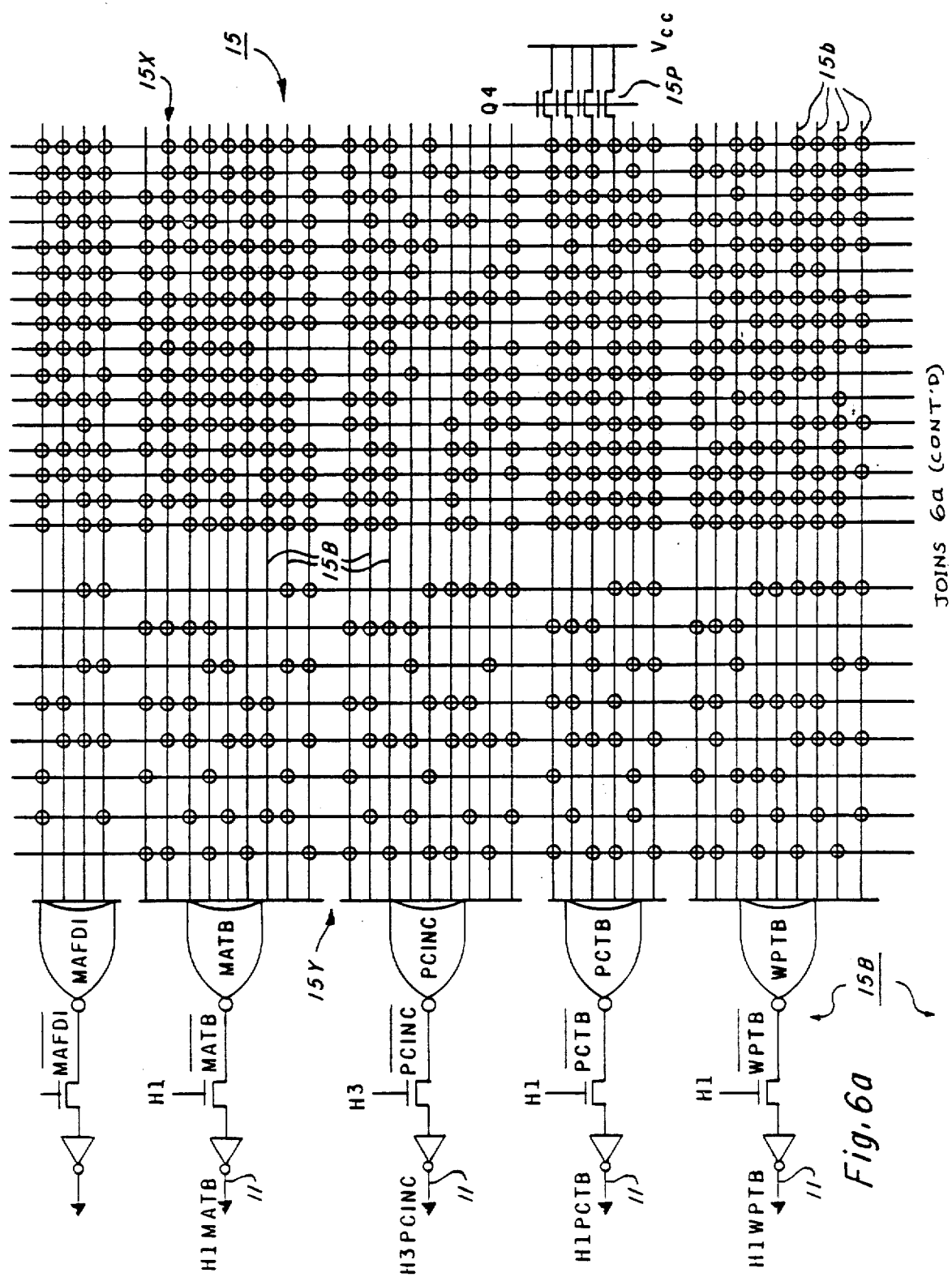
Figure 6A:
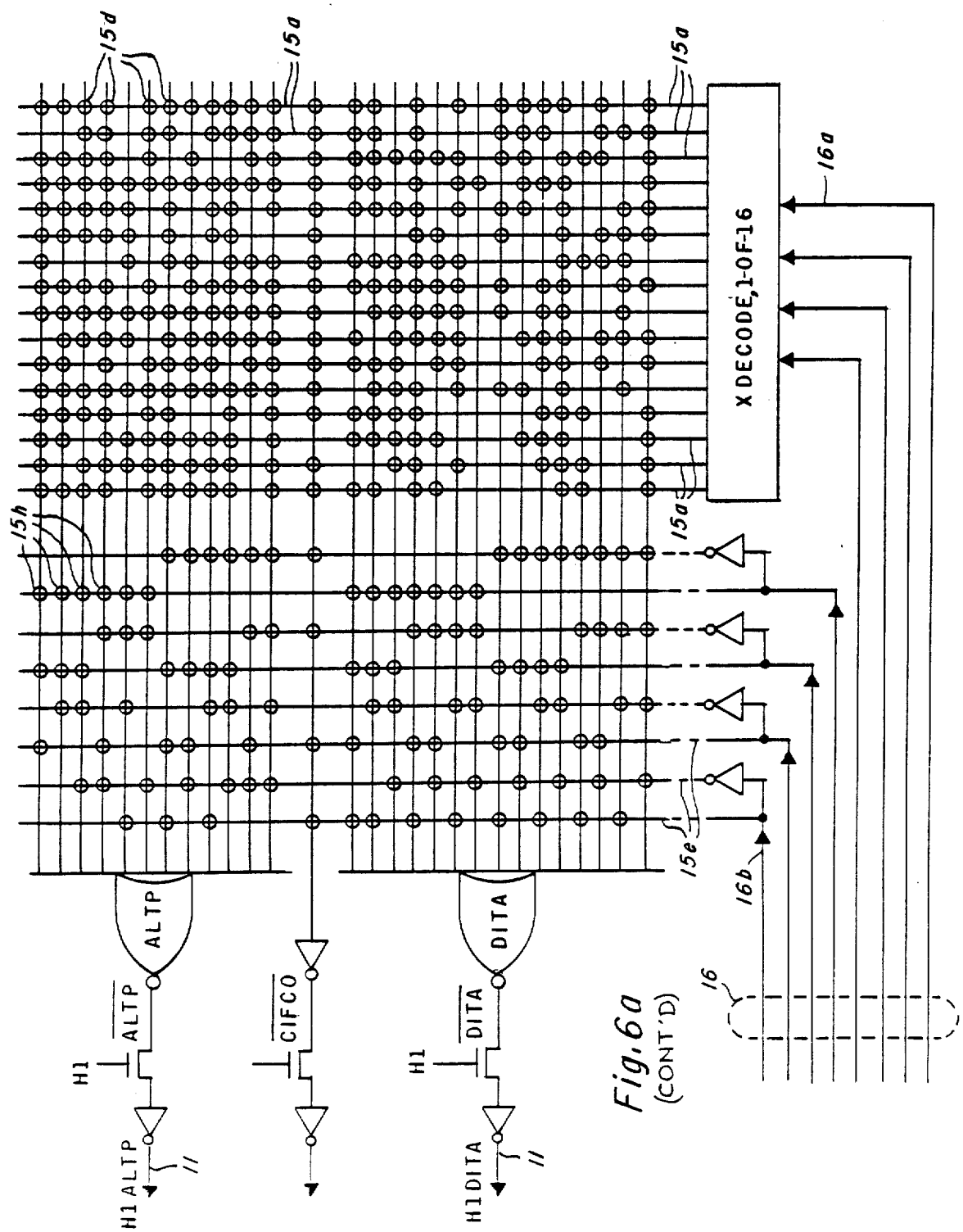
Figure 6B:
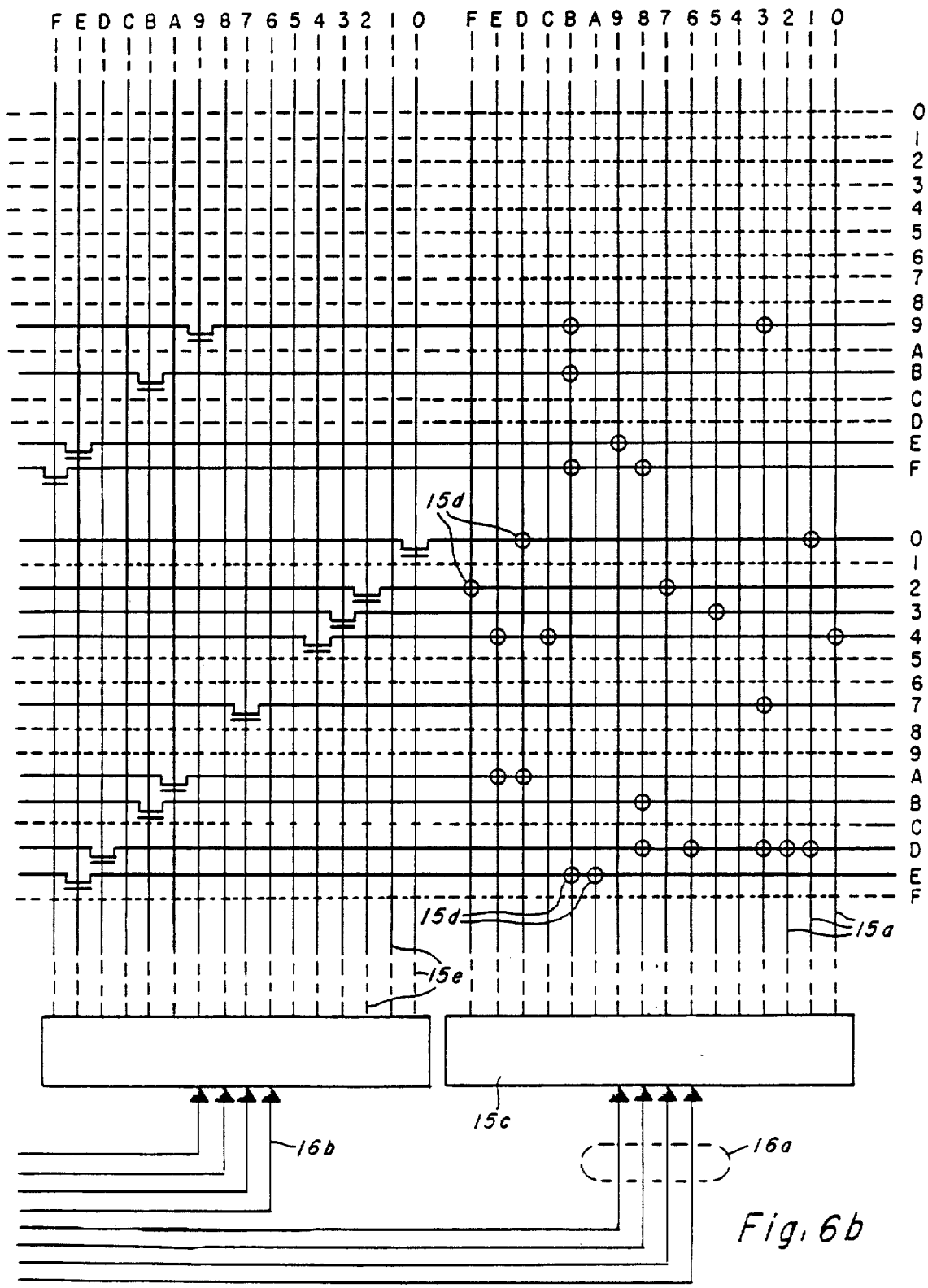

The processor architecture within the CPU chip 1 is shown in block diagram form in FIG. 3, and in chip layout form in FIG. 4; the processor is shown in logic diagram form in FIGS. 5 and 6 of U.S. Pat. No. 4,402,044 which is incorporated herein by reference. Generally, the processor includes an ALU or arithmetic logic unit 10 along with its associated registers, controls, data paths and related logic circuitry. This ALU is adapted for use in the system of FIG. 1, but features of this CPU architecture may be used in other similar systems.

The ALU 10 consists of sixteen parallel binary adder/logic states which function as the computational component of the processor. The ALU 10 receives a 16-bit "A" input 10A and a 16-bit "B" input 10B to produce a 16-bit parallel output 10C. The A input 10A of the ALU is from a 16-bit parallel A bus. The data on the A bus is active low; the indicators $\overline{A}$, A−, or NA should be used in referring to this bus to be technically accurate, and the same is true of the other busses. The A bus may receive data from any one of several sources as will be described, with selection of inputs being made by control inputs 11. Similarly, the B input 10B is from a 16-bit parallel B bus which may receive data from any one of several sources as defined by control inputs 11. The output 10C from the ALU 10 goes to either a P bus or an E bus under control on inputs 11. The ALU performs all the arithmetic and logic functions required to execute microinstructions in the processor such as the functions of addition, subtraction, AND, OR, exclusive OR, complement, etc. as needed for the instructions of Table D of U.S. Pat. No. 4,402,044.

The processor has a number of registers associated with the ALU 10, only three of which are accessable to the programmer. These three are a program counter or PC register, a workspace pointer or WP register, and a status register ST. Other internal registers which are used during the acquisition or execution of instructions are inaccessable to the programmer.

The program counter PC is a 15-bit counter that contains the word address of the next instruction following the instruction currently executing. The fifteen stages are left-justified with the 16th bit hardwired to 0; instructions in the memory 2 are constrained to word boundries, so a single byte is not accessed, only even addresses (words) can be used. The microprocessor references this address to fetch the next instruction from memory 2 and the program counter PC increments the address when the new instruction is executing. If the current instruction in the microprocessor 1 alters the contents of the program counter PC, then a program branch occurs to the location in memory 2 specified by the altered contents of the program counter. All context switching operations, such as interrupts, plus simple branch and jump instructions, affect the contents of the program counter. The program counter can be loaded from the E bus by lines EPC, or its contents applied to the B bus via lines PCB or alternatively to the P bus via lines PCP. All such transfers to or from the program counter are defined by control inputs 11, of course. Internally, the program counter PC includes binary add circuitry to add-1 to the count contained in the 15-bit register at the proper time, again under control of an input 11.

The status register ST is a 16-bit register that contains the results of program comparisons, indicates program status conditions, and supplies interrupt mask level to the interrupt priority circuits. Each of the sixteen bit positions in the status register signifies a particular function or condition that exists in the microprocessor 1; these bit position assignments are shown in Table B of said Patent. Some instructions use the status register ST to check for a prerequisite condition; others affect the values of the bits in the registers; and others load the entire status register with a new set of parameters. Interrupts also modify the status register. The detailed description of the instruction set (Table D of said Patent) shows the effect of each instruction on the status register. All sixteen bits of the status register ST may be loaded from the E bus via lines EST or loaded onto the E bus via lines STE, upon a command on the control lines 11.

The processor 1 uses blocks of words in the memory 2, called workspaces, for instruction operand manipulation instead of internal hardware registers. A workspace occupies sixteen contiguous memory words as in FIG. 2b, in any part of memory 2 that is not reserved for other use. The individual workspace registers may contain data or addresses, and function as operand registers, accumulators, address registers, or index registers. Some workspace registers are dedicated to take on special significance during execution of certain instructions, as seen in Table D of said Patent.

A large number of these 16-word workspaces may exist in the 32K words of memory 2, providing a high degree of program flexibility. To locate the workspace in memory 2, the hardware register WP or the workspace pointer is used. The workspace pointer WP is a 15-bit register (left justified with 16th or LSB hardwired to 0) that contains the memory address of the first word in the workspace of FIG. 2b.

The processor accesses any register in the workspace of FIG. 2b by adding twice the register number to the contents of the workspace pointer and initiating a memory request for that word. The 16th bit is 0 so this is equivalent to adding two times the register number to WP. FIG. 2b illustrates the relationship between the workspace pointer and its corresponding workspace in memory. The WP register is loaded onto the B bus via lines WPB, or loaded from the DI bus via lines DIWP, under command of the control lines 11.

This workspace concept is particularly advantageous during operations that require a context switch, which is a change from one program to another, as in the case of a subroutine or an interrupt. Such an operation using a conventional multi-register arrangement requires that at least part of the contents of the register file be stored and reloaded, using a memory cycle to store or fetch each word. The processor 1 accomplishes this operation by changing the workspace pointer WP. A complete context switch requires only three store cycles and three fetch cycles, exchanging the program counter PC, status register ST, and workspace pointer WP. After the switch, the workspace pointer WP contains the starting address of a new 16-word workspace (FIG. 2b) in memory 2 for use in the new routine. A corresponding time savings occurs when the original context is restored. As seen in Table D of said Patent, instructions in the processor 1 that result in a context switch include: Branch and Load Workspace Pointer (BLWP), Return from Subroutine (RTWP), and an Extended Operation (XOP) instruction; device interrupts, the arithmetic overflow interrupt, illegal op-code detection trap, and others also cause a context switch by forcing the processor to trap to a service subroutine.

The internal registers not accessable to the user (programmer) in the processor 1 include a memory address or MA register, a data or D register, and a K register. The D register is connected as input to a swap bus S via parallel lines DS, and a swap bus output on lines SK may be applied to the K register, all under control of commands on the lines 11. The D register functions principally as a data output latch, and is loaded from the E bus via lines ED. The D register is applied to a DI bus by sixteen parallel lines DDI. The data path from the output 10C of the ALU to the E bus and thus to the D register via lines ED, then to the DI bus via lines DDI and to the A input of the ALU via the A bus is useful in divide routines, for example. Primarily, however, output data is loaded into the D register from the E bus, then to swap bus S via lines DS, and then to sixteen address/data buffers 12 via lines 13. Data can be transferred onto the swap bus S straight or swapped, depending upon factors like byte operations being performed; these transfers are of course under control of commands on lines 11.

The address/data buffers 12 are sixteen bidirectional, tristate buffers of conventional form, each having an input/output terminal connected to one of the external bus lines 4. These buffers usually receive addresses from the P bus via lines 14, or data via lines 13, for output to the bus 4; for input to the microprocessor chip 1, program or data words are applied via lines 13 to the swap bus S, thence to the K register via lines SK. It is also possible to load the P bus from the K register via lines PK, under a command on a line 11, and thus output the K register via the P bus.

The addresses to memory 2 are usually sent out from the microprocessor 1 via the P bus which is loaded by sixteen lines MAP from the MA register. The bits in this register can also be transferred to the B bus via parallel lines MAB, thus to the B input 10B of the ALU; alternatively the MA register may be loaded from the E bus via lines EMA or from the K latch via lines KMA, all as defined by control lines 11.

Another internal register transparent to a user is the temporary or T register. This register receives a 16-bit parallel output 10F from the ALU 10, and applies its output to the B bus in three ways: either directly via lines TB, shifted left via path TLB or shifted right via path TRB. The T register can also receive the B input 10B to the ALU delayed by ⅜ of a clock cycle by a path BT. The T register provides an important function in multiply and divide operation as will be explained.

A register also used in multiply and divide operations is referred to as the MQ shift register (for multiply/quotient). This register has the capability of right shift or left shift by commands on lines 11. The register may be loaded from the A bus or the DI bus by 16-bit parallel lines AMQ and DIMQ, or may be outputted to the E bus or the B bus via lines MQE or MQB. For bit or serial CRU operations involving the CRU 7, the "0" bit of the MQ register is loaded from the "0" A/D buffer 12 at a line CMQ; the output for this purpose is by way of the D register, in parallel, even though only one bit may be used.

An instruction register IR provides the usual function of containing the current instruction, the instruction being executed during a given microcode state time (machine cycle). The instruction register IR is loaded from the DI bus via lines DIIR, or may be loaded into the E bus via lines IRE, under control of lines 11. Various fields of the instruction going to IR also can go to A bus by 2-bit and 4-bit connections IR2 and IR4. During each cycle, however, the contents of the instruction register IR are transferred via sixteen parallel lines IR0-IR15 to entry point and microcontrol generator circuits as well as miscellaneous control circuitry.

The control signals 11 are generated in a control ROM 15 which is in this case split into two halves, 15H for the high side and 15L for the low side of the ALU and registers. Since there are many controls 11 used on only part of the bits, high or low, rather than all sixteen, space is saved by splitting the control ROM 15 in this manner. Each half of the control ROM has an X array 15X and a Y-select array 15Y. Buffers 15B for each line 11 receive the select outputs from the Y array 15Y and introduce clock or other logic as may be needed to produce the controls in the lines 11. The number of microcontrol lines 11 is about 142, depending upon the instruction set (Table D of said Patent) to be implemented, well within the addressing range (256) of an 8-bit address on lines 16 that go to both sides 15H and 15H. This 8-bit control ROM address is generated by entry point logic or by a microjump circuit. Microjump addresses, produced on eight lines 17 which receive outputs 11 from the control ROM, can generate a jump address for the next state. The microjump address on lines 17 is fed back to a logic array 18 that can also generate an entry point from inputs received from an execute entry point array 19E or a source/destination address entry point array 19A. A group detect circuit 20 receives the 16-bit instruction word from IR as well as status bits from ST and other controls and produces two inputs to the entry point arrays 19A and 19E, first a group identification and second a field. The group is determined by the left-most 1 of the opcode as seen in FIG. 2c of said Patent, and the field is three or four bits starting with the left-most 1. The address to the control ROM 15 on the lines 16 may also be held in an 8-bit latch 21 so the same state is re-executed as in multiply or divide instructions; to this end a 4-bit state counter SC is provided which counts state-times up to sixteen, and an overflow output of the state counter can control release of the holding latch 21. Thus, operation of the processor is controlled by instructions loaded into the IR register to generate an entry point via group detect 20 and logic arrays 18, 19A, 19E; the entry point is a starting address for the control ROM 15 entered on address lines 16. This address results in a specific set of commands on the control lines 11; some lines 11 will be active and most not. The address may also produce a jump address on lines 17 to define the control ROM address for the next state, or the next state may be another entry point, or may be the same state due to the holding latch 21. When the last state needed for the instruction is reached, the next instruction is loaded into register IR and another entry point derived.

As described in said Patent, the control ROM 15 is of the "compressed ROM" configuration, according to a feature of one embodiment.

The control outputs 11 from the control ROM 15 also produce bus status codes for lines 6 by a generator circuit 22. The bus status codes of Table E of said Patent are each generated in response to the specified conditions; an external device can by decoding BST1-BST3 on the lines 6 and MEM- on one of the lines 5 determine exactly what activity is presently being implemented on the bus 4.

Figure 2E:
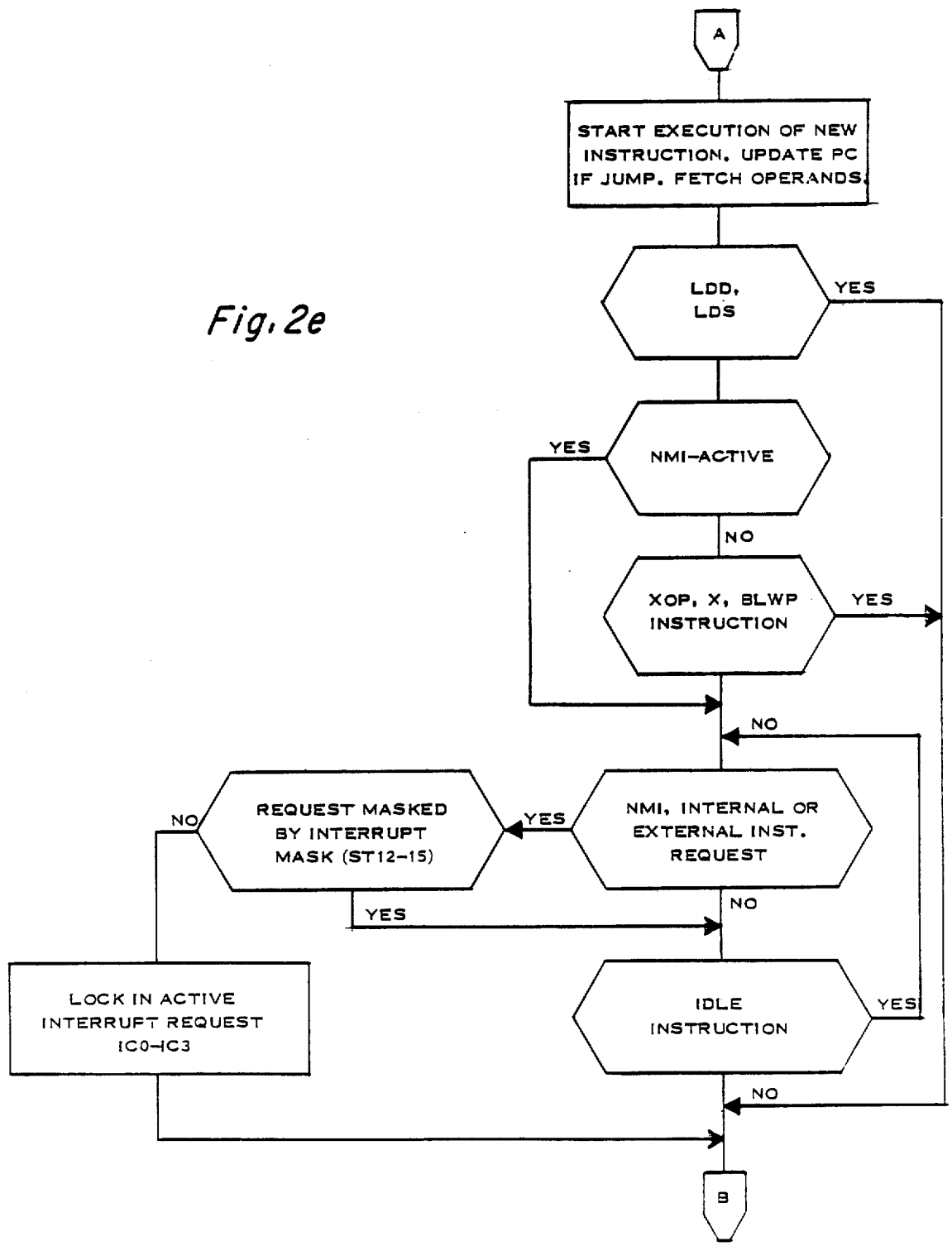
Figure 2H:
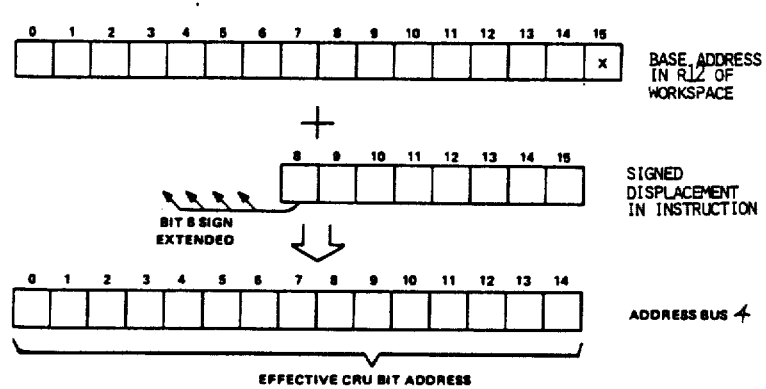
Figure 2I:
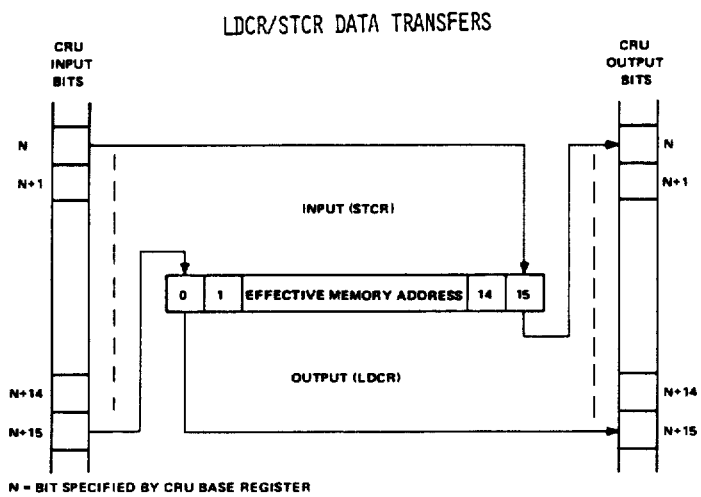

The interrupt codes on the lines 8 and the controls 9 are applied to interrupt control circuitry 23 within the chip 1. Bits 12-15 from the status register ST are also applied to the circuitry 23 to provide the interrupt mask for comparison with an interrupt code from external logic. A logic flow chart defining how interrupts are handled by the processor 1 is shown in FIG. 2e of said Patent (four sheets).

The external control lines 5 are connected to control generator circuitry 24 which responds to lines 11 from the control ROM as well as to other conditions within the chip, and to the lines 5, to produce the necessary internal controls and other external controls 5.

An on-chip memory array 25 is included on the processor chip 1 to provide added functions not in the instruction set of Table D. This memory 25 contains a section 25A of ROM, for example 512 words, and a second 25B of RAM, for example sixteen words or one workspace. The ROM 25A resides at hex addresses 0800-0BFE and the RAM 25B at hex address 0000-001E, but these are not within the memory map of FIG. 2b; these locations are merely examples. A memory address decode circuit 25C receives a memory address on lines 25D from the P bus and selects one word from the ROM or RAM 25A, 25B, which is input or output via data I/O circuit 25E to lines 13 on sixteen parallel lines 25F. An on-chip memory control 25G detects a specified opcode referred to as MID or macro-instruction detect (in this example either an illegal opcode or an XOP executed while bit-11 of status register ST is set to one; the control 25G is activated to transfer exectuion to the on-chip memory 25. When entering this operation, a context switch saves the WP, PC and ST register contents in registers R13, R14 and R15 of the 16-word workspace in RAM 25B. The CPU then executes assembly language instructions (Table D of said Patent) from the ROM 25A; during execution of these macroinstructions, various microinstructions may access the external memory 2 in the usual manner using indirect, indirect autoincrement and indexed addressing modes. By providing this on-chip memory space 25 separate from the external user space (memory map of FIG. 2b), new instructions can be emulated in a manner completely transparent to the programmer. These new instructions are constructed using the Table D set plus special instructions; a customer for the processor chip 1 may specify certain added instructions to be implemented via on-chip memory 25, yet the customer can write the programs to be stored in ROM 25A to execute these instructions using the Table D instruction set. Detailed operation of the memory 25 is explained below.

An important feature is that the ALU 10 and its associated registers K, D, MA, PC, WP, T, MQ, ST and IR as described above are laid out on an MOS/LSI chip in a regular strip pattern as seen in FIG. 4a of said Patent. Each of these registers as well as the ALU contains sixteen bits or stages which are laid out in a pattern like memory cells, the bits arranged horizontally in FIG. 4 as seen; the A, B, DI, E and P busses of FIG. 3 are each sixteen parallel metal strips on top of the cells of the ALU and registers (rather than beside the registers as depicted in FIG. 3), and all of the dozens of control lines 11 are horizontal polysilicon lines as they are used as the control gates of for transistors in the ALU 10 and its registers. The number of control lines 11 needed for the ALU 10 is greater than for a single register such as the WP register, for example, and it is a fortunate circumstance that the space needed to lay out the ALU stages is greater than for a single register, so waste space is minimized. That is, the space needed in the control ROM 15 to generate the controls is the same as the space needed for the controlled circuitry. This layout arrangement is indeed advantageous when used with the compressed "wide-word" control ROM or decoder as will be described because it fits exactly alongside the control ROM with virtually none of the wasted space which would be used only for routing conductors in conventional construction of microprocessors. That is, all bus lines A, B, DI, E and P etc., and all control lines 11 are routed over or under functional regions or cells of the chip rather than over unused silicon, and almost all 90° turns are produced inherently at functional cells rather than in conductor routing. In the prior devices the control ROM, the registers, the ALU, etc., were islands of circuitry connected by busses or conductors. The enlarged view of FIG. 4a of said Patent shows a small part of the ALU 10 and registers, illustrating the metal bus lines and the polysilicon control lines 11 for an N-channel silicon gate MOS device made generally according to U.S. Pat. No. 4,055,444 assigned to Texas Instruments.

It is significant to note that most of the connecting lines such as KDI, ED, EMA, MAB, DINP, etc. as mentioned above are not physically lines or elongated conductors at all but instead are merely metal-to-silicon contact areas along the metal bus lines of FIG. 4a of said Patent. That is, routing of 16-bit parallel conductors is minimized by the strip feature.

The circuits and operation of the processor device of FIG. 3 are described in detail in U.S. Pat. No. 4,402,044, incorporated herein by reference.

The memory 2 can be accessed within a state time of the microprocessor 1, so when an address is sent out on the bus 4 during Q2 of a given state time the contents of the addressed location will appear on the bus 4 for input to the microprocessor chip 1 during Q4 or H4 in the same state time. The add instruction of the example requires five memory access operations: one to fetch the instruction, one to fetch the address of the "source" operand, two for the "source" and "destination" operands, and one to store the result in the memory 2 at the "destination" location.

The instruction for the add operation of this example is fetched before the previous instruction has completed execution. This pre-fetch feature results in a significant advantage in operating speed. It will be assumed that the prior instruction was also an add operation, and that the next instruction following the one of the example is also an add operation, to illustrate the pre-fetch feature and overlap of operations. Of the seven state times partially occupied by the add operation of this example, the first two are shared with the prior instruction and the last two are shared with the following instruction execution; thus only the central three are exclusively used by this add operation.

Referring now to U.S. Pat. No. 4,402,049 a timing chart for execution of the ADD *R, R instruction is illustrated. The seven state times to be discussed are designated S1 through S7. Briefly, during S1 (which overlaps the prior add instruction) the instruction word in question is pre-fetched by sending out the address which is in the PC register onto the bus 4 to access a location in the memory 2 (ordinarily the ROM part which contains program rather than the RAM part which is used for workspaces), then the contents of this location are received back on the bus 4 and loaded in to the instruction register IR. During S2, the result of the prior operation is written into the location in the memory 2 which is in the memory address register MA; the contents of MA register are sent out on the bus 4 followed by the result of the previous add operation. Meanwhile, during S2, the contents of the WP register are added in the ALU 10 to a number derived from the instruction word pre-fetched during S1; this number is two times the source register number, or 2S. So, the address of the source register is calculated during S2 and is stored in the MA register, then during S3 this address is sent out on the bus 4 to access the source address contained in the selected register of the workspace; this source address is read from the memory 2 and returns via bus 4 to be stored in MA and K registers in microprocessor 1. During S4 state time the address of the source operand is sent out from the K register onto bus 4 and the contents at this address in memory 2 returned via bus 4 to the K register.

Also during S4 the destination address is calculated in ALU 10 by adding the contents of the WP register to two times the "D" field of the instruction word and storing the result in the MA register. Next, during S5, this calculated D address (within the workpiece, thus "direct") is sent out from MA register on bus 4 while the operand in the K register is moved to the T register. Then, the contents of the addressed register in memory 2 is returned via bus 4 to be stored in the K register of the chip 1, still during S5. Now the add operation is ready to be implemented; the S operand is in the T register and the D operand is in the K register. Thus, during state S6 the add operation is executed by adding the contents of K and T and putting the result in the D register. Meanwhile, however, during S6 the instruction for the next operation is pre-fetched by sending out the address in the program counter PC (which has been incremented) onto bus 4 and receiving the contents of this address in memory 2 back via bus 4 to be loaded during S7 in the instruction register IR in chip 1. Also, during S7 state time, the result of our example add operation is written into memory 2 by first sending out the address in the MA register (which is the D or destination address calculated during S4) onto bus 4, followed by the contents of the D register, completing execution of the ADD *R, R instruction. During S7, incidentally, the source address for the next instruction is calculated in the ALU 10 adding the contents of the workspace pointer WP to two times the S field of the instruction word accessed in S6, so another add operation is already two state times into its execution sequence. Accordingly, the states S6 and S7 correspond to the states S1 and S2 of FIG. 7 of U.S. Pat. No. 4,402,044.

The instruction word for "ADD R*, R" is shown in FIG. 7a of U.S. Pat. No. 4,402,044. This is the sixteen bit word which is read during S1 state time in FIG. 7 of said patent, i.e., the contents of the location addressed by the PC register, in this example. The first 3-bit field 010 says "add". The "B" field, bit 3, defines whether this is a byte operation or a word operation; in this example it is a word operation. If B=1, the operands are bytes and the operand addresses are byte addresses. With B=0, the operands are words. The TD and TS fields, bits 4, 5 and 10, 11, determine the addressing mode of that operand. In the example, TS is 00 so the S field (bits 12-15) contains the register number in the workspace which has the source operand. TD is 01, meaning indirect workspace register addressing mode, so the D field (bits 6-9) contains the register number in the workspace which has the address of the distination operand in it.

Considering the execution of the ADD *R, R instruction example in more detail, it will be noted that FIG. 7 of said patent also shows the contents of the various registers and busses as a function of time, as well as other features. Each of register and bus operations will be examined for each microcode state time, along with the control signals produced on the lines 11 to produce these operations.

In the S1 state time of FIG. 7 of U.S. Pat. No. 4,402,044, the control line 11 for H1PCTP (see FIG. 5c of said patent) is high during H1, turning on transistors PCi and placing the contents of the PC register on the P bus. Then the DEN command goes high on H1, so the P bus is loaded into the output buffers 12 and thus to the bus 4. The program counter PC is incremented during H3 time by the H3PCINC command on a line 11, turning on transistors PCj and PCm of FIG. 5c of said patent, so later at S6 the next instruction in sequence will be accessed. A DEN signal comes up on H2 on a control line 11 to produce a DEN-command at H3 on one of the lines 5 to enable the memory 2 to put data on the bus 4 beginning at Q4. The instruction word fetched here is valid on the bus 4 beginning at Q4, and is loaded into the K register via lines SK by a control H3 KFSS generated every H3 except when blanked; this control turns on the sixteen transistors Ki of FIG. 5b of U.S. Pat. No. 4,402,044. During this state time S1 an add operation for the prior instruction occurs just as will be described for S6, directing the result to the E bus. A control SAMPI on one of the lines 11 causes the interrupt lines 8 to be sampled so that if an interrupt is present a context switch will occur.

Turning now to the S2 state time of FIG. 7 of U.S. Pat. No. 4,402,044, the instruction which is in the K register is connected to the DI bus at Q1 when the Q1KTDI command goes high and turns on the sixteen transistors Kg; this command occurs every Q1 unless blanked by a control line 11. A command 2STA at H1 causes the S field of the instruction word on the DI bus to be left-shifted and connected by four transistors Ca to bit-11 through bit-14 of the A bus as seen in FIG. 5e of said patent. The contents of the workspace pointer register WP are transferred to the B bus at H1 by the H1WPTB command on a line 11 turning on the transistors WPf of FIG. 5c of said patent. Thus, with WP on the B bus and 2S on the A bus, when the ALU 10 operates (at H2 and H3) an output will be produced at node 10C during H3 which is the sum (WP+2S). A command ALTE on a line 11 occurs at delayed H1 time, meaning delayed one state time, so at H1 of the next cycle the ALU output is connected by transistors 10a to the E bus. As will be described below with reference to the S7 state, the result of the previous operation is written into memory 2 from D register which was loaded from the E bus at H4; the ALU 10 loaded the E bus at S2, H1 (the same as HD1 for S1).

During the S3 state time of FIG. 7 of U.S. Pat. No. 4,402,044, the address of the register which will contain the source address is generated by an ALU operation. In this operation the contents of the workspace pointer register WP are applied to the B bus by an H1WPTB command turning on transistors WPf and an IR2D command at H1 which applies bit-6 through bit-9 of the instruction register IR to bit-11 through bit-14 of the DI bus via the transistors IRe' of FIG. 5g of said patent. The IR2D command in effect left shifts the D field of the instruction word (see FIG. 7a of said patent) by one bit to multiply by binary two, then applies it to the A input of the adder via the DI bus. The ALU 10 is in the add condition by default, none of the ALU 1-ALU 4 commands being present, and the input 10c is applied to the E bus at H1 of the next state time by the HD1ALTE command on the line 11 to the gates of transistors 10a (FIG. 5d of said patent).

EXECUTION OF SIGNED DIVIDE INSTRUCTION

The processor 1 executes the signed divide instruction (DIVS in Table D) in a preferred manner, compared to prior processor devices. Generally the processor implements the algorithm set forth at pp.363-368 of "Digital Systems: Hardware Organization and Design", by Hill and Peterson, published 1973 by Wiley & Sons, Inc. The 16-bit divisor is fetched from the source address in memory 2 and its absolute value stored in the D register. The 32-bit dividend is fetched from workspace registers 0 and 1 in memory 2 and its absolute value placed in the T register (MSB's) and the MQ register (LSB's). The quotient is shifted one bit at a time into the LSB of the MQ register as the dividend is left-shifted. The sign of the result is the exclusive-OR of the signs of the divisor and dividend. The remainder is in the T register at the end of the algorithm, and is written into the workspace register 1, and has the same sign as the dividend. The signed quotient is written into workspace register 0 from the T register.

An important feature of the processor 1 particularly for the divide instruction is the construction of the B input to the ALU 10 with the shifted input from the T register and the ability to write the B input back into the T register in the next state time, depending upon the result of the ALU operation. Prior CPU's did the shift function at the ALU output instead of input, and used additional machine cycles to evaluate the result of each subtraction and restore the original number if it was negative. The CPU described herein can execute each substract-test-restore sequence in one state time instead of several state times.

The divide algorithm requires sixteen repetitions of one basic sequence. The divisor is placed on the A input of the ALU 10 from the D register, the sixteen MSB bits of the dividend are placed on the B input from the T register, and the ALU does a substract operation. If the result is positive, the result goes into the T register and the original MSB bits from the B input discarded; if negative, however, the sixteen MSM bits are restored in the T register from the B input and the result discarded. Also, if the result is positive a one is shifted into the LSB of the MQ register in the next cycle, or if the result is negative, a 0 is written into the LSB of the MQ register when it is left shifted in the next cycle; thus the quotient is generated in the MQ register. The T register is left shifted as it is transferred to the B input in the next stop, and the MQ register is left shifted, putting its MSB onto the B bus to fill the LSB position vacated when the T register is left shifted. All of these operations occur in one state time in the basic sequence, and the sequence is repeated sixteen times in sixteen state times as the 4-bit state counter SC is incremented to overflow.

The signed divide instruction is executed in thirty-four state times, the first two and last two of which overlap the preceding and succeeding instructions because of the prefetch feature. A state-by-state description of the execution of this instruction is seen in FIG. 8 of U.S. Pat. No. 4,402,044.

In S1 of FIG. 8 of said patent, the instruction is fetched by placing the program counter PC on the P bus and enabling DEN-; the program counter is incremented on H3. This state is usually part of a preceding instruction, as is the next state S2 in which the workspace pointer register WP is placed on the B bus, the A bus has a constant 2 placed on it by the constant generator circuit (a 1 is placed in bit-14 of the A bus providing "10" or binary 2), and the ALU does an add operation with the result to the E bus on the next cycle. This gives the address of one of the operands, WP+2 or WR1. The state S2 also includes the write operation for the result of a prior instruction.

The S3 state is a read cycle for the operand at WP+2. The MA register is loaded from the E bus during H4 at the beginning of this state, then an MATP control at H3 sends out this address on the bus 4. In the ALU, the two's complement of the contents of the K register (which is assumed to have been previously fetched and left in the K register) is generated and placed on the E bus during H1 of the next state.

In the S4 state, the result of the previous ALU operation is transferred from the E bus to the D register, and the contents of the WP register transferred through the ALU by a WPTB control and a pass B operation, the result going to the E bus on the next cycle by a HD1ALTE command.

During the S5 state, the MA register is loaded from the E bus during H4, then the MA register transferred to the P bus during H1 and DEN- activated. This fetches the contents of workspace register R0 since WP+0 was sent out as an address on the bus 4. R0, the MSB's of the dividend, is loaded from A/D buffer 12 into the K register, and an ALU operation of K+0 is preformed by KTDI (automatic) and D1TA commands. The result of the ALU operation goes into the T register at H1 of the next cycle.

In S6, the T register is loaded from the F output of the ALU by a TFF command, and the negative of the contents of the D register is generated by D1TA and DTDI commands and ALU 1, ALU 4 and STPG controls. The result goes to the E bus in the next cycle.

This is followed by a conditional subtract operation in S7 to check for a divisor of zero. The T register goes to the B input by a TTB command, and the negative of the K register goes to the A input. All four ALU controls ALU 1–ALU 4 are active. The result goes to the E bus on the next cycle.

Execution From On-Chip Memory

The auxiliary on-chip memory 25 provides a method for adding new functions not in Table D and enhancing the performance of specific kernels of software, thereby increasing the total capabilities of the system of FIG. 1. The memory space 25 is separate from the user space 2 or FIG. 2b and is contained within the microprocessor chip 1. Assembly language program segments located in this space 25 benefit from the full performance capabilities of the processor 1 since no wait states are required for memory accesses. While executing in the on-chip memory 25, certain control capabilities are available which are not accessible by ordinary programs. The auxiliary on-chip memory 25 permits a new instruction to be emulated in a manner completely transparent to the programmer.

The memory 25 consists of 512 16-bit words in ROM 25A and 16 words in RAM 25B. The ROM resides at addresses (in hexadecimal) 0800–0BFE, and the RAM resides at addresses 0000–001E, serving as workspace storage during execution in memory 25.

Whenever the processor 1 encounters an MID opcode (an illegal opcode or an XOP executed while status bit-11 is set to 1), a check is made to determine whether an attached processor is prepared to respond to the MID opcode. If not, program control is transferred to the memory 25.

The memory 25 is entered via an entry point table occupying the first ten words of the ROM 25A. Each entry in the table contains the start address in ROM 25A of an emulation routine for a particular MID opcode or group of opcodes. Illegal single-word opcodes are divided into eight groups, with the entry addresses for each group as indicated in Table F of said patent. Illegal two-word opcodes are treated as a ninth group, and XOPs as a tenth, as shown in Table F. When an illegal opcode or XOP is encountered, instruction execution transfers to the ROM 25A address in the entry-point table corresponding to that opcode.

A context switch occurs after the entry-point address has been read from the table. The workspace pointer is set to 0000 and the program counter is set to the entry-point address. The old WP, PC, and ST are placed in the RAM 25B at locations in the workspace corresponding to R13, R14 and R15, respectively. The PC valve saved in R15 points to the word following the MID opcode. If the MID opcode is a multiple-word instruction, the saved PC points to the location following the first word of the instruction.

To exit the memory 25, a context switch is invoked by executing a RTWP instruction (opcode 0380 in hex). Interrupts are checked prior to executing the next instruction. In those instances where interrupts (maskable or non-maskable), should not be checked before executing the next instruction, the exit from the memory 25 is invoked using the opcode 0381, a special form of the RTWP instruction. In either case, the WP, PC, and ST registers are updated with R13, R14 and R15 from the RAM 25B. If the memory 25 is entered upon detection of an MID opcode not supported by the memory 25, a level-2 trap must be executed to indicate that an attempt has been made to execute an undefined opcode. The opcode 0382 is provided to exit the memory 25 under these conditions. When his opcode is executed in memory 25, an RTWP occurs followed by a level-2 trap. The opcodes 0380, 0381 and 0382 (hex) provide the only valid means for performing an exit for memory 25.

During emulation of an MID opcode in memory 25, the emulation routine can modify the saved status register in R15 in accordance with the results of the emulated opcode. Upon return from the memory 25, the updated status is passed to the main instruction stream. If the status is not updated, it will be restored in its original form.

During execution in the memory 25, several processor functions are modified to provide increased control. These are interrupts, external memory accessing, an evaluate address instruction EVAD, and conditional jump, as will now be described.

All interrupts except reset are inhibited while executing from memory 25. However, pending interrupts can be detected using the conditional jumps described below.

During execution from memory 25, data in external (off-chip) memory 2 is accessed using the indirect, indirect autoincrement and indexed addressing modes. Workspace registers R2, R6, R7, R8, R9, R10, R13 and R14 in the RAM 25B are used as base registers during external accesses. An external access using one of these registers is accompanied by a bus status code indicating a particular type of memory cycle, and MEM- is active low. The bus status code corresponding to the use of each register is indicated in Table G. An external access should utilize a base register whose use is accompanied by a bus status code appropriate to the type of access being performed; the programmer selects a register from Table G accordingly.

Two examples illustrate use of the external access capability. First, R13 in the RAM 25B contains the user's workspace pointer. To read into register R1 in the workspace of RAM 25B the contents of register R4 in the workspace in memory 2 from the main instruction stream executing just prior to entering memory 25 (i.e. the "user's" workspace), the instruction

MOV @8(R13),R1 is executed from memory 25. This instruction says move the contents of the location of address at R13 plus 2×4=8 into R1. A WS bus status code is output during this operation (MEM-=0, BST=110). Second, to read immediate data or a symbolic address (following an MID opcode in the user's program) into R4 in RAM 25B, the instruction

MOV *R14+,R1 is executed while in memory 25. This causes the user's PC in R14 in RAM 25B to be incremented by two, and an IOP bus status code is output (MEM-=0, BST=010).

Using register R0, R1, R3, R4, R5, R11 and R15 as base register for indirect, indirect autoincrement or indexed addressing results in an internal access in the memory 25. During internal accesses, the MEM-, WE- and DEN-signals output from the processor 1 remain inactive high. During execution from memory 25, a NOP bus status code is output during each machine cycle except when an external access is in progress, as explained above.

An EVAD (evaluate address) instruction is provided during execution from memory 25 to permit convenient calculation of effective source and destination addresses for MID opcodes. EVAD assumes that the MID opcode contains a four-bit opcode, a six bit source field and a six-bit destination field. The address calculations are based upon the original WP of the user, saved in R13 in RAM 25B. If the contents of a register in the user's workspace are fetched as part of the address calculation, a WS bus status code is output by the processor 1 while the external access takes place. The saved PC (in R14 of RAM 25B) is incremented appropriately if symbolic or indexed addressing is used. The contents of any workspace register in RAM 25B except R0 can be evaluated using EVAD. When EVAD is executed, the calculated effective source address is placed in R8 in RAM 25B, and the calculated destination address in R7. If the source or destination field specifies autoincrement mode, the address of the user's register is placed in R9 or R10, respectively. A summary of the EVAD instruction, including its effect on status bits 0 and 2, is given at the end of Table D.

For EVAD instructions, if only the source field of an MID opcode is to be evaluated, the destination field should be cleared to prevent unnecessary external accesses or unintentional modification of the user's PC. For example, if the MID opcode resides in R5 in RAM 25B, the instruction sequence

ANDI R5, 003F

EVAD R5 is executed while in the memory 25 to calculate the effective source address. The destination field, which is all zeros, is interpreted as register direct addressing mode (and ST2 is cleared).

The TB (test bit), SBO (set bit to one) and SBZ (set bit to zero) instructions are not available during execution from memory 25. In place of these operations and using the same opcodes are conditional jump instructions used to detect pending interrupts. These instructions, described at the end of Table D of said patent, allow interrupts to be tested at interruptible points in routines executed from memory 25. Instructions requiring long execution times, such as block move instructions for a minicomputer, can be emulated in a way that permits them to be interrupted and resumed after interrupt servicing.

One restriction exists regarding the use of MID opcodes within interrupt service routines. An MID opcode encountered in the interrupt routine for an NMI or level-1 interrupt, or for a reset routine that does not cause complete system reinitialization, must not result in an exit from the memory 25 by means of opcode 0382, the special form of RTWP that causes a level-2 trap. The reason is that the level-2 routine can be interrupted by an NMI, by a level-1 interrupt or by reset, possibly destroying the return linkage established previously. In general, this restriction can be interpreted to mean that an MID opcode in the service routine of an interrupt of higher priority than level-2 must either be recognized by an extended instruction set processor or defined by an emulation routine in the memory 25, The last sixteen words of the ROM 25A may be reserved for self-test software used to verify ROM 25A and RAM 25B operation. MID opcode 002D, defined to be the opcode for an execute micro-diagnostics instruction in a minicomputer, is executed in the user program to invoke the self-test routine. Upon encountering this opcode, the processor 1 transfers control to the ROM 25A location (start address of the test routine) pointed to by the address contained in entry-point table location 0804, in the manner indicated in Table F.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed:

1. A microprocessor comprising:
    a main memory containing a plurality of locations defined by an address space, the main memory having an address input, a data output and a control input,
    a central processing unit in a semiconductor unit separate from said main memory, said central processing unit including an arithmetic logic unit, a plurality of registers, a program counter, an instruction register for receiving program instructions addressed by said program counter for execution by the central processing unit, such program instructions being of a predetermined instruction set as stored in said main memory, and control means responsive to the program instructions of said instruction set in said instruction register to produce a plurality of controls for defining the operation of the central processing unit and for generating memory controls,
    bus means connecting terminals of the central processing unit to the address input and data output of said main memory to transfer addresses from the program counter of the central processing unit to said main memory and to transfer instructions from said main memory to the central processing unit, the number of bits of said program counter and said bus means for such addresses defining the size of said address space, said bus means also transferring said memory controls from said control means to said control input of said main memory,
    a first storage means containing sequences of program instructions in a plurality of memory locations defined by a first set of addresses, and means coupling addresses from said program counter to the first storage means to fetch instructions while disabling said main memory by said memory controls whereby the first set may overlap said address space,
    a separate second storage means containing sequences of program instructions in a plurality of memory locations defined by a second set of addresses, and means coupling addresses from said program counter to the second storage means to fetch instructions while disabling said main memory by said memory controls whereby the second set may overlap said address space,
    and means initiated by the control means in response to predetermined program instructions, for transferring sequences of program instructions from such first or second storage means to said instruction register, such sequences being instructions of said instruction set.

2. Apparatus according to claim 1 wherein said first storage means is on a single semiconductor integrated circuit with said central processing unit.

3. Apparatus according to claim 2 wherein said main memory is not on said integrated circuit.

4. Apparatus according to claim 3 wherein said second storage means is not on said integrated circuit.

5. Apparatus according to claim 4 wherein said first and second storage means are activated in the alternative.

6. A microprocessor system comprising:
    (a) a first memory containing a plurality of locations with a first set of addresses defining a first memory map, the first memory containing program instructions and data,
    (b) input/output means for receiving and transmitting information,
    (c) a central processing unit connected to said first memory and said input/output means by conductor means to couple addresses, program instructions, data and information between the memory, input/output means and central processing means, said central processing unit being constructed in a single semiconductor device and comprising:
    an arithmetic logic unit for performing arithmetic and logic operations on data,
    a plurality of registers for containing addresses and data,
    a program counter coupled to said conductor means,
    an instruction register for receiving program instructions addressed by the program counter for execution by the central processing unit, such program instructions being of a predetermined instruction set, the number of bits in the program counter defining the size of said first memory map,
    control means responsive to the program instruction in said instruction register to produce a plurality of controls for defining the operation of the central processing unit, and for generating memory controls,
    a second memory within said device containing sequences of program instructions in a plurality of locations with a second set of addresses defining a second memory map, wherein the second set of addresses may overlap said given first set of addresses, said second memory including a control input receiving said memory controls from said control means, with addressing means initiated by the memory controls from said control means in response to predetermined program instructions for transferring said sequences of program instructions from such second memory to said instruction register as addressed by the program counter in response to predetermined program instructions, such sequences being composed of instructions of said instruction set, and (d) a third memory separate from said device connected to the device by said conductor means and containing sequences of program instructions in a plurality of locations with a third set of addresses not within said second memory map, said third memory means including a control input receiving said memory controls from said control means, said addressing means transferring said sequences of program instructions from said third memory to said instruction register via said conductor means for addresses within the third set.

7. A system according to claim 6 wherein said second memory is on a single semiconductor integrated circuit with said central processing unit.

8. A system according to claim 7 wherein said first memory and said third memory are not on said integrated circuit.

9. Apparatus according to claim 8 wherein said second memory and said third memory are accessed in the alternative.

10. Apparatus according to claim 8 wherein said second memory is deactivated when accessing the third memory.

11. Apparatus according to claim 8 wherein said first memory map is limited by the logical address space allowed by the number of bits of addresses coupled by said conductor means.

* * * * *